US012567738B1

(12) United States Patent
Moffett et al.

(10) Patent No.: US 12,567,738 B1
(45) Date of Patent: Mar. 3, 2026

(54) SOLID-STATE SWITCH ARRAYS FOR DIGITIZED PLASMA CONTROL AND MAGNETO-INERTIAL FUSION APPLICATIONS

(71) Applicant: Equilibria Power, Grant, FL (US)

(72) Inventors: Mark B. Moffett, Grant, FL (US); David L. Chesny, Satellite Beach, FL (US)

(73) Assignee: Equilibria Power, Grant, FL (US)

( * ) Notice: Subject to any disclaimer, the term of this patent is extended or adjusted under 35 U.S.C. 154(b) by 0 days.

(21) Appl. No.: 19/256,080

(22) Filed: Jun. 30, 2025

Related U.S. Application Data

(60) Provisional application No. 63/821,187, filed on Jun. 10, 2025.

(51) Int. Cl.
H02H 9/04 (2006.01)
G21B 1/21 (2006.01)

(52) U.S. Cl.
CPC .............. H02H 9/045 (2013.01); G21B 1/21 (2013.01)

(58) Field of Classification Search
CPC .................................. H02H 9/045; G21B 1/21
See application file for complete search history.

(56) References Cited

U.S. PATENT DOCUMENTS

| 3,059,149 A | 10/1962 | Salisbury |
| 3,486,088 A | 12/1969 | Gray et al. |

(Continued)

FOREIGN PATENT DOCUMENTS

| CN | 112511136 A | * | 3/2021 | ........ | H02M 7/53871 |
| CN | 115529709 A | * | 12/2022 | .............. | H05H 1/36 |

(Continued)

OTHER PUBLICATIONS

Cassibry, J. T., "Estimates of Confinement Time and Energy Gain for Plasma Liner Driven Magnetoinertial Fusion Using an Analytic Self-Similar Converging Shock Model", *Physics of Plasmas*, Nov. 2009, vol. 16, No. 11, pp. 112707-1-112707-10, American Institute of Physics, USA.

(Continued)

*Primary Examiner* — Danny Nguyen
*Assistant Examiner* — Nicolas Bellido
(74) *Attorney, Agent, or Firm* — Perkins Coie LLP

(57) ABSTRACT

Solid-state switch array apparatus and methods for digitized plasma magneto-inertial fusion are disclosed herein. A solid-state switch array apparatus for enabling discharge of direct current includes multiple solid-state switches arranged in series and parallel configurations. The apparatus includes corresponding series resistor circuits connected in parallel with each solid-state switch to distribute voltage across the switches and receive constant current flow from a power supply during charging. Snubber circuits including capacitors configured in parallel with each solid-state switch protect against transient back electromotive force during discharge. A ferrite core assembly includes wire fed through ferrite cores wound and connected to gates and cathodes of the solid-state switches. The ferrite core assembly delivers voltage pulses to simultaneously transition all switches to a conducting state in response to discharge from a discharge circuit capacitor, enabling control for plasma generation applications.

19 Claims, 17 Drawing Sheets

(56) References Cited

U.S. PATENT DOCUMENTS

| | | | | |
|---|---|---|---|---|
| 7,072,196 | B1 | 7/2006 | Glidden et al. | |
| 11,558,048 | B2 * | 1/2023 | Miller | H03K 17/56 |
| 2003/0021131 | A1 * | 1/2003 | Nadot | H02M 7/519 |
| | | | | 363/55 |
| 2003/0103312 | A1 * | 6/2003 | Wagoner | H01L 25/117 |
| | | | | 361/151 |
| 2015/0061751 | A1 * | 3/2015 | Reshetnyak | H03K 17/6871 |
| | | | | 327/419 |
| 2019/0139650 | A1 | 5/2019 | Laberge et al. | |
| 2023/0285927 | A1 * | 9/2023 | Medvedev | C01B 32/40 |

FOREIGN PATENT DOCUMENTS

| | | | |
|---|---|---|---|
| EP | 2582047 | A2 | 4/2013 |
| JP | 2017017849 | A * | 1/2017 |

OTHER PUBLICATIONS

Cassibry, J. T., "Ideal Hydrodynamic Scaling Relations for a Stagnated Imploding Spherical Plasma Liner Formed by an Array of Merging Plasma Jets", *Physics of Plasmas*, Mar. 2013, vol. 20, No. 3, pp. 032706-1-032706-11, American Institute of Physics, USA.

Cassibry, J. T., "Tendency of Spherically Imploding Plasma Liners Formed by Merging Plasma Jets to Evolve Toward Spherical Symmetry", *Physics of Plasmas*, May 2012, vol. 19, No. 5, pp. 052702-1-052702-9, American Institute of Physics, USA.

Ghandhi, Sorab Khushro, "Semiconductor Power Devices: Physics of Operation and Fabrication Technology", 1977, p. 220, Wiley, New York, USA.

Heljestrand, Anders, "Overstressing of High-Voltage Capacitors", *IEEE Transactions on Plasma Science*, Jul. 2004, vol. 32, No. 3, pp. 1337-1343, IEEE, USA.

Hsu, S. C., "Spherically Imploding Plasma Liners as a Standoff Driver for Magnetoinertial Fusion", *IEEE Transactions on Plasma Science*, May 2012, vol. 40, No. 5, pp. 1287-1298, IEEE, USA.

Hsu, Scott C., "Spherically Imploding Plasma Liners: A Potentially Transformative Fusion Driver", ALPHA Annual Meeting, Seattle, Washington, Aug. 1, 20160, 15 pages, Los Alamos National Laboratory.

Hsu, Scott C., "Spherically Imploding Plasma Liners: A Potentially Transformative Fusion Driver", ALPHA Annual Meeting, San Francisco, California, Aug. 29, 2017, 16 pages, Los Alamos National Laboratory.

Lajoie, A. L., "Formation of a Spherical Plasma Liner for Plasma-Jet-Driven Magneto-Inertial Fusion", Physics of Plasmas, Oct. 2024, vol. 31, No. 10, pp. 102701-1-102701-15, American Institute of Physics, USA.

SCILLC (On Semiconductor), "Thyristor Theory and Design Considerations", Handbook HBD855/D, Rev. 1, Nov. 1, 2006, Scillc, USA.

Taylor, Paul D., "Thyristor Design and Realization", 1993, pp. 4-6, Wiley, New York, USA.

Witherspoon, F. D., "MiniRailgun Accelerator for Plasma Liner Driven HEDP and Magneto-Inertial Fusion Experiments", 36th ICOPS Meeting, San Diego, California, Jun. 1, 2009.

Yates, K. C., "Experimental Characterization of a Section of a Spherically Imploding Plasma Liner Formed by Merging Hypersonic Plasma Jets", *Physics of Plasmas*, Jun. 2020, vol. 27, No. 6, pp. 062706-1-062706-16, American Institute of Physics, USA.

Ex-Parte Quayle Action issued Oct. 7, 2025, in U.S. Appl. No. 19/256,110 (11 pages).

* cited by examiner

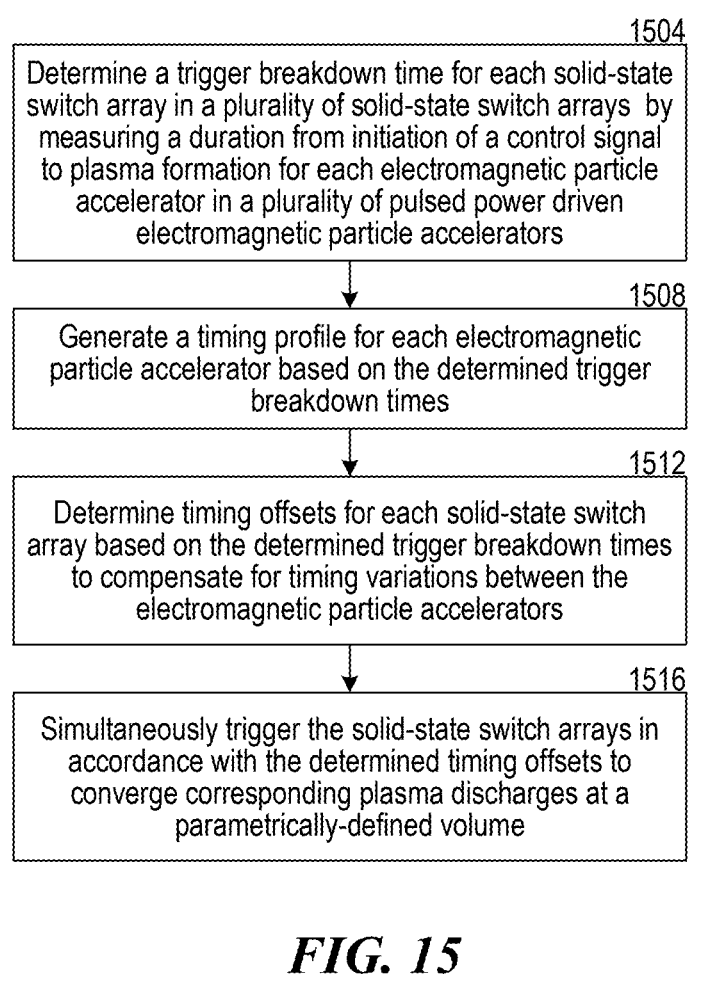

1504

Determine a trigger breakdown time for each solid-state switch array in a plurality of solid-state switch arrays by measuring a duration from initiation of a control signal to plasma formation for each electromagnetic particle accelerator in a plurality of pulsed power driven electromagnetic particle accelerators

1508

Generate a timing profile for each electromagnetic particle accelerator based on the determined trigger breakdown times

1512

Determine timing offsets for each solid-state switch array based on the determined trigger breakdown times to compensate for timing variations between the electromagnetic particle accelerators

1516

Simultaneously trigger the solid-state switch arrays in accordance with the determined timing offsets to converge corresponding plasma discharges at a parametrically-defined volume

*FIG. 15*

SOLID-STATE SWITCH ARRAYS FOR DIGITIZED PLASMA CONTROL AND MAGNETO-INERTIAL FUSION APPLICATIONS

CROSS-REFERENCE TO RELATED APPLICATIONS

This application claims the benefit of priority of U.S. Provisional Patent Application No. 63/821,187, filed Jun. 10, 2025. The content of the foregoing application is incorporated in its entirety by reference.

TECHNICAL FIELD

This disclosure relates generally to solid-state switching systems for high-voltage pulsed power applications, and more particularly to modular solid-state switch arrays with protective circuitry for digitized plasma control and magneto-inertial fusion systems. For example, several embodiments of the present technology relate to modular solid-state switch arrays that use switching elements arranged in series and parallel configurations with protective circuitry to enable high-voltage pulsed power control for plasma generation applications. Several embodiments of the present technology relate to digital control systems that coordinate multiple electromagnetic particle accelerators using solid-state switch arrays to achieve synchronized plasma convergence for magneto-inertial fusion reactions.

BACKGROUND

High-voltage pulsed power systems have applications including plasma physics, fusion energy development, and electromagnetic particle acceleration. These systems typically require the ability to rapidly discharge large amounts of electrical energy stored in capacitive elements through switching mechanisms that can handle thousands of volts and amperes within sub-microsecond timeframes. The switching technology employed in such systems directly impacts the precision, efficiency, and reliability of the power delivery to various loads such as plasma generation devices and magnetic field coils.

Spark gap switches have been commonly employed in pulsed power applications due to their ability to handle high voltages and currents. However, these switches operate through gas breakdown mechanisms that introduce variability in timing and require adjustment of pressure and electrode spacing to achieve desired performance characteristics. This variability can limit the precision achievable in applications where multiple synchronized discharges are required. Additionally, spark gap switches typically exhibit lower efficiency compared to solid-state alternatives and may require frequent maintenance due to electrode erosion. The development of solid-state switching technologies offers potential improvements in timing precision, efficiency, and operational reliability, though implementation challenges exist in scaling these technologies to handle the high voltage and current requirements of pulsed power applications.

BRIEF DESCRIPTION OF THE DRAWINGS

Many aspects of the present disclosure can be better understood with reference to the following drawings. The components in the drawings are not necessarily to scale. Instead, emphasis is placed on illustrating clearly the principles of the present disclosure. The drawings should not be taken to limit the disclosure to the specific embodiments shown, but are provided for explanation and understanding.

FIG. 15 is a flow diagram illustrating an example method of digitized plasma magneto-inertial fusion in accordance with various embodiments of the present technology.

Figure 1:
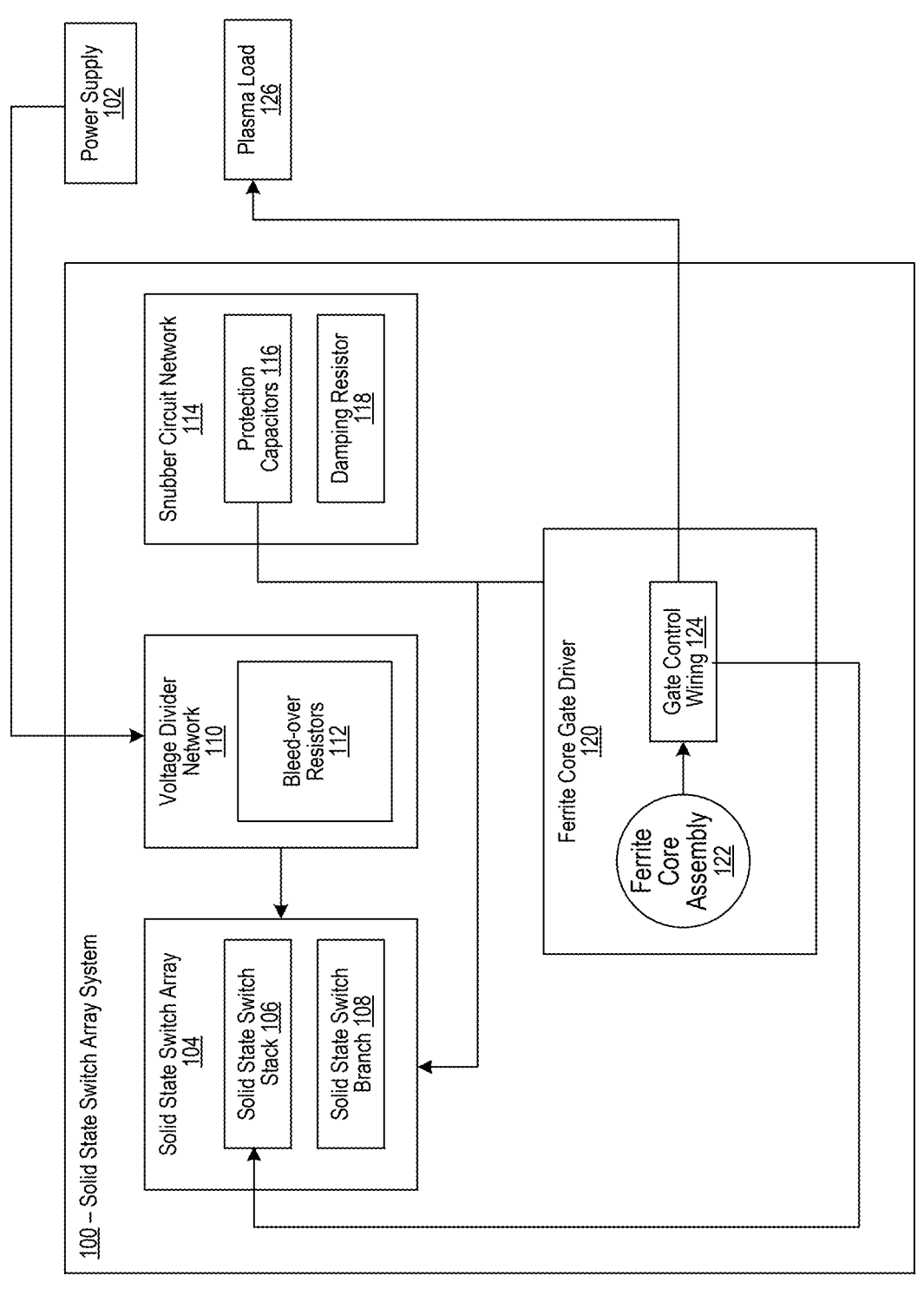
FIG. 1 illustrates a system diagram of an example solid state switch array system configured in accordance with various embodiments of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The present technology is generally directed to solid-state switch array systems that enable control of high-voltage, high-current pulsed power for plasma generation and magneto-inertial fusion applications. The technology can include modular thyristor-based switching elements arranged in series and parallel configurations with protective circuitry, including voltage divider networks that prevent overvoltage conditions during charging, snubber circuits that protect against transient back electromotive force during discharge operations, and ferrite core assemblies that provide simultaneous triggering across multiple switches. The disclosed systems can incorporate digital control mechanisms that coordinate multiple electromagnetic particle accelerators by determining trigger breakdown times, generating timing profiles, and determining timing offsets to achieve synchronized plasma convergence at parametrically-defined volumes. The technology can provide improvements in timing precision, efficiency, and reliability compared to spark gap switching systems while enabling modular scalability for various plasma physics and fusion applications.

In the following description, specific details are set forth to provide a thorough understanding of aspects of the present technology. One skilled in the relevant art will recognize, however, that the systems, devices, and techniques described herein can be practiced without one or more of the specific details set forth herein, or with other methods, components, materials, etc.

Reference throughout this specification to an "example" or an "embodiment" means that a particular feature, structure, or characteristic described in connection with the example or embodiment is included in at least one example or embodiment of the present technology. Thus, use of the phrases "for example," "as an example," or "an embodiment" herein are not necessarily all referring to the same example or embodiment and are not necessarily limited to the specific example or embodiment discussed. Furthermore, features, structures, or characteristics of the present technology described herein may be combined in any suitable manner to provide further examples or embodiments of the present technology.

Spatially relative terms (e.g., "beneath," "below," "over," "under," "above," "upper," "top," "bottom," "left," "right," "center," "middle," and the like) may be used herein for ease of description to describe one element's or feature's relationship relative to one or more other elements or features as illustrated in the figures. It will be understood that the spatially relative terms are intended to encompass different orientations of a device or system in use or operation, in addition to the orientation depicted in the figures. For example, if a device or system illustrated in the figures is rotated, turned, or flipped about a horizontal axis, elements or features described as "below" or "beneath" or "under" one or more other elements or features may then be oriented "above" the one or more other elements or features. Thus, the exemplary terms "below" and "under" are non-limiting and can encompass both an orientation of above and below. The device or system may additionally, or alternatively, be otherwise oriented (e.g., rotated ninety degrees about a vertical axis, or at other orientations) than illustrated in the figures, and the spatially relative descriptors used herein are interpreted accordingly. In addition, it will also be understood that when an element is referred to as being "between" two other elements, it can be the only element between the two other elements, or one or more intervening elements may also be present.

Overview

Many high-voltage pulsed power systems rely on spark gap switches for controlling electrical discharges in plasma physics and fusion applications. These spark gap switches operate by creating an ionization path between an anode and cathode within a low-pressure chamber, where the breakdown voltage can be controlled by adjusting chamber pressure and electrode spacing. While spark gap switches can handle high voltages and currents, they introduce significant timing variability due to their analog nature and dependence on gas breakdown mechanisms. This variability limits precision in applications requiring synchronized discharges, and the switches typically exhibit lower efficiency compared to solid-state alternatives. Additionally, spark gap switches require frequent maintenance due to electrode erosion and can be loud and bright during operation.

Many existing solid-state switching approaches for high-voltage applications focus on steady-state current applications such as power grid voltage regulation, where switches handle hundreds to perhaps a thousand amperes in continuous operation. However, these existing solid-state switching systems face challenges when applied to pulsed power applications requiring thousands of amperes in microsecond-duration bursts. The semiconductor devices in these systems can break when subjected to overvoltage conditions during charging phases or when exposed to transient back electromotive force spikes during rapid current discharge events. Furthermore, achieving simultaneous triggering across multiple solid-state switches in an array configuration presents timing coordination challenges that can result in uneven current distribution and component failure.

Many plasma physics facilities recognize the need to transition toward solid-state switching for improved efficiency and precision, yet few have successfully implemented such systems due to the technical challenges of scaling solid-state switches to handle the high voltage and current requirements while maintaining the sub-microsecond-level timing precision necessary for plasma generation applications. The lack of effective protection mechanisms during charging, discharging, and post-discharge phases has prevented widespread adoption of solid-state switching in pulsed power applications, leaving many implementations dependent on less efficient and less precise spark gap technologies.

The present technology provides solid-state switch array systems that address the limitations of existing spark gap switching using modular switching elements arranged in series and parallel configurations with protective circuitry. The disclosed systems include multiple solid-state switches with a corresponding bleed-over resistor connected in parallel with each switch to distribute voltage and prevent overvoltage conditions during charging phases. The systems can incorporate snubber circuits including capacitors configured in parallel with each solid-state switch to protect against transient back electromotive force during discharge operations. The systems can incorporate a ferrite core assembly with wire fed through ferrite cores that delivers voltage pulses to simultaneously transition all switches to a conducting state. A load balancer can be included whose resistance is associated with a total resistance of the bleed-over resistor circuits in the solid-state switch array. The load balancer can complement the bleed-over resistors to provide voltage control across both the solid-state switch array and a plasma chamber, enabling operation of the solid-state switch array for plasma generation applications. The disclosed configurations enable control of high-voltage, high-current pulsed power delivery while maintaining sub-microsecond-level timing precision necessary for plasma generation applications.

The disclosed technology further includes digital control systems that coordinate multiple electromagnetic particle accelerators using the solid-state switch arrays to achieve synchronized plasma convergence for magneto-inertial fusion reactions. A digital control system can determine trigger breakdown times for each solid-state switch array by measuring duration from control signal initiation to plasma formation, generate timing profiles based on these measurements, and determine timing offsets to compensate for variations between electromagnetic particle accelerators. The disclosed systems can simultaneously trigger the solid-state switch arrays according to the determined timing offsets to converge plasma discharges at a parametrically-defined volume, enabling repeatable and predictable plasma interactions necessary for fusion applications.

The disclosed solid-state switching technology provides advantages over existing spark gap systems by preventing timing variability through digital control mechanisms, improving efficiency through solid-state operation, and enabling modular scalability where individual switching modules can be combined to achieve higher voltage and current ratings than single switches alone. The disclosed protective circuitry prevents catastrophic failure during charging, discharging, and post-discharge phases through voltage divider networks that distribute charging currents, snubber circuits that absorb transient energy spikes, and ferrite core assemblies that provide simultaneous switching across multiple elements. This protection enables reliable operation over hundreds of discharge cycles while maintaining the precision timing control required for advanced plasma physics and fusion applications.

Selected Embodiments of Solid-State Switch Arrays and Associated Systems and Methods FIG. 1 illustrates a system diagram of an example solid state switch array system 100 for high-voltage pulsed power applications. The solid state switch array system 100 can be implemented using computer hardware, software, firmware, or a combination thereof. As shown, the solid state switch array system 100 includes a power supply 102, a solid state switch array 104, a voltage divider network 110, a snubber circuit network 114, a ferrite core gate driver 120, and a plasma load 126. The solid state switch array system 100 can further include a series solid state switch stack 106, bleed-over resistors 112, protection capacitors 116, damping resistors 118, a ferrite core assembly 122, and gate control wiring 124.

The power supply 102 provides electrical energy to the solid state switch array system 100 during charging operations. The power supply 102 connects to the voltage divider network 110 to deliver direct current (DC) voltage for storage in capacitive elements within the solid state switch array system 100. In some cases, the power supply 102 may be configured to charge the solid state switch array system 100 with a recharge time capability of approximately 30 seconds between discharge cycles. The power supply 102 enables the solid state switch array system 100 to achieve a target discharge frequency of, e.g., 1 Hz for repeated pulsed power operations.

The solid state switch array 104 includes multiple solid-state switches arranged in series and parallel configurations to handle high voltage and current requirements. The solid state switch array 104 includes a solid state switch stack 106 that contains switching elements connected in series to increase voltage handling capability. The solid-state switches in the apparatus may include silicon-controlled rectifiers (SCRs) or insulated-gate bipolar transistors (IG-BTs). SCRs operate as PNPN junction devices that transition from non-conductive to conductive states when triggered by gate signals from the ferrite core assembly 122. IGBTs provide alternative switching characteristics for specific high-voltage, high-current pulsed power applications. Both device types are arranged in series and parallel configurations within the solid state switch array 104, incorporating the voltage divider network 110 and snubber circuit network 114 for protection during charging and discharge operations in plasma generation systems.

In some cases, the solid state switch array 104 may be configured as an 8×3 array with 8 modules connected in series and 3 branches connected in parallel, enabling the solid state switch array system 100 to achieve, e.g., 4000 volts (V) and 3000 amperes (A) discharge capabilities. The solid state switch array 104 may alternatively be configured as a 16×8 array to achieve higher voltage and current ratings. The solid state switch array 104 may be configured to hold back a DC voltage supplied by a charged capacitor during charging phases. In some cases, the solid state switch array 104 may be configured for, e.g., 48 switches used simultaneously to handle high-power discharge operations. The solid state switch array 104 may be implemented as a custom circuit card assembly with a 10 cm×4 cm footprint for more compact packaging. The solid state switch array 104 may be immersed in mineral oil for cooling and insulation during high-power operations.

A parallel solid state switch branch 108 provides current multiplication capability by connecting multiple solid-state switching elements in a parallel configuration. This arrangement enables the solid state switch array system 100 to handle higher current levels while maintaining the same voltage rating. The parallel branches work in conjunction with the solid state switch stack 106 to achieve both voltage stacking and current sharing. Each parallel branch can incorporate a voltage divider network and snubber circuit protection to provide balanced current distribution and prevent component failure during high-power discharge operations.

The voltage divider network 110 includes bleed-over resistors 112 connected in parallel with individual switching elements in the solid state switch stack 106. The voltage divider network 110 distributes voltage evenly across the solid-state switches during charging operations to prevent overvoltage conditions that could damage the switching elements. The voltage divider network 110 may be configured to receive constant current flow from the power supply 102 during the charging phase. The bleed-over resistors 112 provide current paths that allow small leakage currents to flow around the solid-state switches rather than through the switching elements themselves. Each switch in the solid state switch array 104, including components in the switch stack 106 and parallel switch branch 108, is paired with its own bleed-over resistor. The total resistance of this network depends on the series-parallel configuration of the switches and their associated resistors. This configuration prevents voltage buildup that could lead to Paschen breakdown-a phenomenon where air ionizes and conducts electricity when the voltage across a gap exceeds a critical threshold. By selecting and configuring the bleed-over resistors 112, the voltage across any part of the solid-state switch array 104 remains below the Paschen breakdown threshold. This prevents unwanted arcing or sparking that could damage the switches or compromise system safety.

In some cases, the bleed-over resistors 112 have resistance values determined by the bleed-over current characteristics of the corresponding solid-state switches during overvoltage conditions. As used herein, "bleed-over current characteristics" may refer to the behavior of small leakage currents that flow around a semiconductor device when subjected to voltages approaching its breakdown threshold, potentially affecting voltage distribution in high-power applications. For example, bleed-over current characteristics may include various aspects of leakage current behavior in solid-state switch configurations. One such characteristic is the magnitude of leakage current that flows through a resistor connected in parallel with a solid-state switch as the voltage approaches the breakdown threshold. This current typically increases as the applied voltage nears the switch's maximum rating. Another important characteristic is the rate at which this leakage current increases with rising voltage. This rate of change can provide information about the switch's behavior near its operational limits and may influence the design of protective circuits.

The solid-state switch array 104 connects to a power supply 102 for charging and a plasma load 126 for discharge applications. During operation, the switches hold back high voltage until triggered, at which point they transition to a conducting state, allowing for controlled high-current, high-voltage discharges. As used herein, "holding back a voltage" refers to the ability of the solid-state switches to withstand and prevent the flow of a high DC voltage during a charging phase, maintaining an open circuit state until triggered to conduct. The snubber circuit network 114 suppresses voltage and current transients during these rapid switching events, enabling reliable operation in demanding pulsed power applications like plasma generation.

The snubber circuit network 114 includes protection capacitors 116 and damping resistors 118 configured to protect the solid-state switches from transient electrical effects during switching operations. A protection capacitor is configured in parallel with each solid-state switch to protect the switching elements from transient back electromotive force generated during discharge operations. As used herein, "back electromotive force" refers to a transient voltage spike generated in an electrical circuit during rapid current changes, particularly during switching operations. It may potentially damage solid-state switches if it is not properly mitigated by protective measures such as the snubber circuits. The protection capacitors 116 absorb and dissipate electrical energy spikes that occur during rapid current discharge events. A corresponding damping resistor 118 is connected in series with each protection capacitor 116 to control the rate of energy dissipation and prevent oscillatory behavior in the snubber circuit network 114. The damping resistor 118 can dissipate energy that accumulates in the capacitor 116 during switching events. The damping resistor 118 can dampen oscillations that may occur between a capacitor and parasitic inductances present in the circuit. By implementing this resistor-capacitor arrangement, the snubber circuit network 114 protects the solid state switch array 104 from potentially harmful transient voltages and currents. In some cases, the snubber circuit network 114 may use 2 μF capacitors and 2 ohm resistors for transient suppression.

In alternative implementations, protection from the back electromotive force can be implemented using a secondary solid-state switch in parallel with a primary solid-state switch. In this configuration, the secondary solid-state switch remains in a non-conducting state during the primary solid-state switch's normal operation. Once the primary solid-state switch completes its switching cycle, the secondary solid-state switch is activated. This activation allows the secondary solid-state switch to provide a controlled path for any back electromotive force generated during the turn-off process of the primary solid-state switch. By offering this alternative path, the secondary solid-state switch effectively diverts the back electromotive force away from the primary solid-state switch, protecting it from potential damage. This method may be useful in high-voltage pulsed power applications where precise control of energy flow is needed. The timing of the secondary solid-state switch's activation can be coordinated with the primary solid-state switch's operation to improve protection.

The ferrite core gate driver 120 includes the ferrite core assembly 122 and the gate control wiring 124 that enable simultaneous triggering of multiple solid-state switches in the solid state switch array 104. The ferrite core assembly 122 includes wire fed through ferrite cores that are wound and connected to corresponding leads of gates and cathodes of the solid-state switches. The gate control wiring 124 connects the ferrite core assembly 122 to individual gate terminals of the solid-state switches in the solid state switch stack 106. The ferrite core gate driver 120 may be configured to deliver voltage pulses to the gates of the solid-state switches to simultaneously transition the switching elements to a conducting state in response to discharge from a discharge circuit capacitor. The ferrite core assembly 122 provides electromagnetic coupling that ensures coordinated switching behavior across the entire solid state switch array 104.

The ferrite core assembly 122 is configured to simultaneously trigger the gates of all solid-state switches. It delivers a coordinated voltage pulse through the gate control wiring 124 to the gates of the switches, causing them to transition to the conducting state simultaneously in response to the DC discharge signal. This simultaneous triggering mechanism provides timing control and coordinated switching behavior across the entire solid-state switch array 104. Rapid, synchronized discharge of high-voltage, high-current pulses from a power supply 102 to the plasma load 126 is enabled. The modular design of the solid-state switch array 104, coupled with the ferrite core-based triggering system, allows for scalable and efficient operation in demanding pulsed power applications such as plasma generation, fusion, and electromagnetic particle acceleration.

In some implementations, a single ferrite core with multiple sets of windings is used to trigger several solid-state switches simultaneously. Instead of individual cores for each switch in the solid state switch array 104, a single core with multiple sets of windings is employed. The gate control wiring 124 can be adapted to connect each set of windings from the single core to a corresponding gate of each solid-state switch in the switch stack 106 and parallel switch branch 108. This configuration allows for 2, 4, etc., solid-state switches to be triggered by a single ferrite core, depending on the number of windings. The ferrite core gate driver 120 would still function to deliver synchronized voltage pulses, but now through the multiple sets of windings on a single core. For example, a ferrite core assembly may have up to 70 windings on a single core to control up to 70 thyristors. This approach maintains the same triggering process while reducing the number of ferrite cores needed, potentially simplifying the design and reducing costs in the switch array system 100.

An alternative method for triggering multiple solid-state switches simultaneously involves using power amplifiers instead of ferrite cores. In this approach, individual power amplifiers are connected to each switch in the solid-state switch array 104. These amplifiers receive a common input signal and amplify it to provide the necessary gate drive voltage and current for each switch. The power amplifiers may be designed to provide galvanic isolation between the control circuitry and the high-voltage switches. This isolation can be achieved through the use of optocouplers or other isolation techniques at the input stage of each amplifier. The amplifiers are typically powered by isolated power supplies to maintain separation between the control and power circuits.

The plasma load 126 serves as a discharge target for high-voltage, high-current pulses generated by the solid state switch array system 100. The plasma load 126 connects to the output of the solid state switch array 104 to receive the controlled electrical discharges. In some cases, the solid state switch array system 100 may be configured for driving a plasma gun or for generating a pulsed magnetic field through the plasma load 126. The solid state switch array system 100 may be configured for use in pulsed DC power applications that require precise timing control. The solid state switch array system 100 may operate at an 8000 A discharge current with discharge durations of 100-122.5 microseconds. In some cases, the solid state switch array system 100 demonstrates 500+ shot reliability for repeated discharge operations without component failure.

In some implementations, the solid-state switch array system 100 enables DC current discharge and can be used for high-voltage pulsed power applications. The solid-state switch array system 100 includes multiple solid-state switches arranged in a solid state switch stack 106, configured in both series and parallel to handle high voltage and current requirements. These switches are designed to transition to a conducting state for direct current discharge. The solid-state switches are configured to hold back DC voltage supplied by a charged capacitor during a charging phase. Power supply 102 can provide constant current flow to the voltage divider network 110 during charging. For example, the solid-state switch array system 100 enables controlled high-voltage, high-current discharges for applications such as plasma generation.

The solid-state switch array system 100 can be flexibly implemented in different configurations. In a first example configuration, the solid-state switch array system 100 includes a solid-state switch array apparatus that includes multiple solid-state switches, a corresponding bleed-over resistor circuit connected in parallel with each solid-state switch, a corresponding snubber circuit connected in parallel with each solid-state switch, a load balance resistor connected across a load of the solid-state switch array apparatus, and at least one ferrite core having multiple sets of windings. For example, the multiple solid-state switches are arranged in series and parallel configurations and are configured to transition to a conducting state for direct current discharge. The corresponding bleed-over resistor circuit is configured to distribute voltage across each solid-state switch during a charging operation to prevent an overvoltage condition across the multiple solid-state switches. The corresponding bleed-over resistor circuit has a resistance associated with bleed-over current characteristics of each solid-state switch during the overvoltage condition. Each solid-state switch is configured to hold back a direct current voltage supplied by a charged capacitor during the charging operation.

The corresponding snubber circuit is configured to absorb electrical energy spikes during the direct current discharge, and protect each solid-state switch from transient back electromotive force generated during the direct current discharge. The corresponding snubber circuit includes a capacitor having a capacitance associated with a characteristic of the load of the solid-state switch array apparatus. The load balance resistor has a resistance associated with a total resistance of corresponding resistor circuits connected in parallel with the multiple solid-state switches. Each of the multiple sets of windings of the at least one ferrite core is connected to corresponding gates of the multiple solid-state switches. The at least one ferrite core is configured to simultaneously trigger the corresponding gates of the multiple solid-state switches, and deliver a voltage pulse to the corresponding gates of the multiple solid-state switches to simultaneously transition the multiple solid-state switches to the conducting state.

In a second example configuration, the solid-state switch array system 100 includes multiple solid-state switches, a corresponding resistor circuit connected in parallel with each solid-state switch, and a corresponding snubber circuit connected in parallel with each solid-state switch. For example, the multiple solid-state switches are arranged in series and parallel configurations and are configured to transition to a conducting state for direct current discharge. The corresponding resistor circuit is configured to distribute voltage across each solid-state switch during a charging operation. The corresponding snubber circuit includes a capacitor configured to absorb electrical energy spikes during the direct current discharge. The corresponding snubber circuit is configured to protect each solid-state switch from transient back electromotive force generated during the direct current discharge. The capacitor has a capacitance associated with a characteristic of a load of the solid-state switch array apparatus.

In a third example configuration, the solid-state switch array system 100 includes multiple solid-state switches, a corresponding resistor circuit connected in parallel with each solid-state switch, a load balance resistor, and a corresponding snubber circuit connected in parallel with each solid-state switch. For example, the multiple solid-state switches are arranged in series and parallel configurations. The corresponding resistor circuit can distribute voltage across each solid-state switch during a charging operation. The load balance resistor is connected across a load of the solid-state switch array apparatus. The load balance resistor has a resistance associated with a total resistance of corresponding resistor circuits connected in parallel with the multiple solid-state switches. The load balance resistor is configured to control voltage distribution between the solid-state switch array apparatus and the load. The corresponding snubber circuit can absorb electrical energy spikes during direct current discharge, and protect each solid-state switch from transient back electromotive force generated during the direct current discharge. The corresponding snubber circuit comprises a capacitor having a capacitance associated with a characteristic of the load of the solid-state switch array apparatus.

The modular solid-state switch array system 100 can be adapted for long-distance power transmission and space communication applications. The solid state switch array 104, including the switch stack 106 and parallel switch branch 108, enables high-voltage, high-frequency modulation of power signals. For space communication, the power supply 102 can be configured to generate high-frequency carrier signals. The solid state switch array 104 would then modulate these signals using techniques like amplitude or phase modulation. The voltage divider network 110 and snubber circuit network 114 ensure stable operation at high frequencies and voltages required for long-distance transmission. The ferrite core gate driver 120 provides precise timing control for modulation, while the gate control wiring 124 distributes synchronized trigger signals across the solid-state switch array 104. The plasma load 126 could be replaced with an antenna system for transmitting the modulated signals into space. This modular approach allows for scalable power and frequency capabilities, making it suitable for various long-distance communication scenarios, including deep space missions or Earth-to-satellite communications.

The solid state switch array system 100 can also be adapted to control large motors (e.g., stepper motors) for rotating massive objects. In this application, the plasma load 126 would be replaced with electromagnetic coils of the stepper motor. The power supply 102 would provide high-voltage DC power, while the solid state switch array 104 controls the pulsed current delivery to the motor coils. The series switch stack 106 and parallel switch branch 108 allow for control of voltage and current levels needed for generating strong magnetic fields. A digital control system can be integrated to manage the switching sequence, controlling the rotation speed and direction. The ferrite core gate driver 120 synchronizes triggering of switches, creating precisely timed magnetic field pulses. The voltage divider network 110 and snubber circuit network 114 protect the system from voltage spikes and transients associated with switching large inductive loads. This configuration provides controlled rotation of massive objects like space station components or large industrial equipment, providing both power and precision.

Figure 2B:
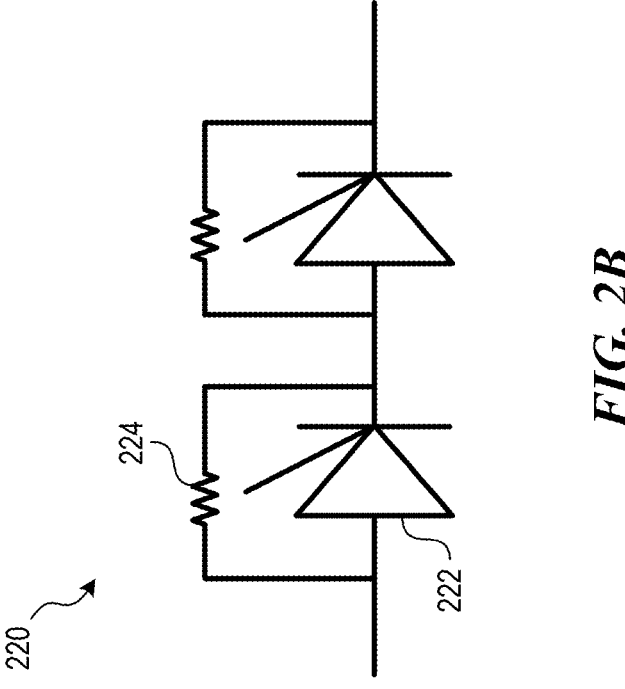
FIG. 2B illustrates an example modular solid-state switch array with two switches configured in accordance with various embodiments of the present technology.
Figure 2A:
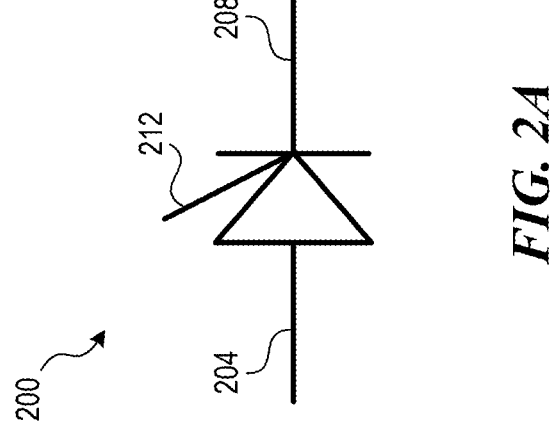
FIG. 2A illustrates an example solid-state switch configured in accordance with various embodiments of the present technology.

FIG. 2A illustrates an example solid-state switch 200 designed for high-voltage pulsed power applications. As shown, the solid-state switch includes a thyristor or IGBT having an anode 204, a cathode 208, and a gate terminal 212. The solid-state switch 200 may be implemented as a silicon-controlled rectifier in puck form factor that provides compact packaging for high-power switching applications. In some cases, the solid-state switch 200 may include an IGBT that offers alternative switching characteristics for specific applications.

The solid-state switch 200 is engineered with specific maximum ratings to provide reliable operation within its design parameters. In some examples, the switch 200 can withstand a maximum voltage of 500 V across its terminals without breakdown. Additionally, it can conduct a maximum current of, e.g., 1400 A without damage, making it suitable for high-current pulsed power applications.

FIG. 2B illustrates an example solid-state switch array 220 designed for high-voltage pulsed power applications. The solid-state switch array 220 includes two solid-state switches 222 arranged in a series configuration. This arrangement enables the solid-state switch array 220 to handle a higher voltage than a single solid-state switch 200. The series configuration allows for voltage stacking, effectively doubling the voltage handling capability of the solid-state switch array 220 compared to a single switch. As a result, the maximum voltage rating of the solid-state switch array increases to 1000 V, while maintaining the current handling capacity of 1400 A from a single switch. The parallel bleed-over resistors 224 provide voltage distribution across the switches during operation, preventing overvoltage conditions on individual switches and enabling the solid-state switch array 220 to safely handle higher voltages in pulsed power applications.

For example, the bleed-over resistor 224 (sometimes referred to as a voltage divider) is connected in parallel with each solid-state switch 222 in the solid-state switch array 220. The voltage divider resistors 224 form a corresponding resistor circuit for each solid-state switch 222. These resistor circuits are configured to distribute voltage across the solid-state switches 222 during a charging operation to prevent an overvoltage condition. The resistances of the voltage divider resistors 224 may be associated with bleed-over current characteristics of the solid-state switches 222 during potential overvoltage conditions. This configuration helps protect the solid-state switches 222 from damage due to excessive voltage.

In the solid-state switch array 220, the solid-state switches 222 are connected such that their anode terminals 204 and cathode terminals 208 form a series path through the solid-state switch array 220. The gate terminal of each solid-state switch 222 provides a control input for triggering the switch. The solid-state switch array 220 may be configured to hold back a DC voltage supplied by a charged capacitor during the charging operation. The multiple solid-state switches 222 in the solid-state switch array 220 may be configured to hold back a greater DC voltage than a single solid-state switch 200 during the charging operation. In some cases, the bleed-over resistors may be configured with 200 kilo ohm resistance values depending on the specific solid-state switch characteristics and voltage requirements.

Figure 2D:
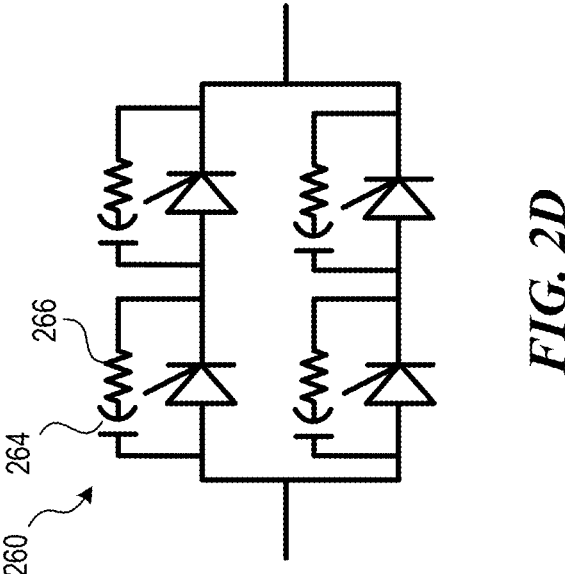
FIG. 2D illustrates an example solid-state switch array with multiple switches configured in accordance with various embodiments of the present technology.
Figure 2C:
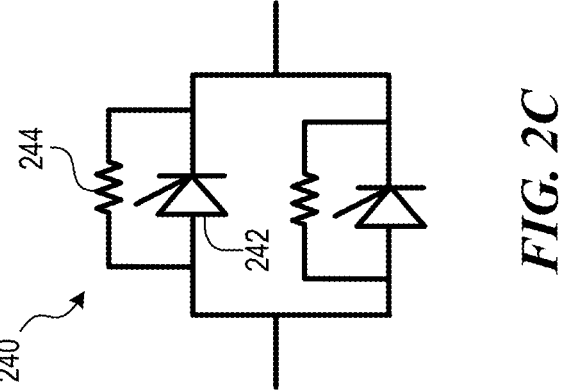
FIG. 2C illustrates an example solid-state switch array configured in accordance with various embodiments of the present technology.

FIG. 2C illustrates an example solid-state switch array 240 configured for high-voltage pulsed power applications. The solid-state switch array 240 includes two solid-state switches 242 with bleed-over resistors 244 connected in parallel.

The bleed-over resistor 244 in the solid-state switch array 240 functions as part of a voltage divider network to distribute voltage across the solid-state switch 242 during charging operations. This helps prevent overvoltage conditions that could damage the solid-state switch 242. The parallel configuration of FIG. 2C can maintain the voltage rating of a single switch at 500 V while doubling the current handling capacity. For example, the switch circuit 240 can manage up to 2800 A, combining the current ratings of both switches. The parallel arrangement allows for increased current flow without compromising the voltage rating, making it suitable for high-current applications.

FIG. 2D shows an example solid-state switch array 260 including four solid-state switches arranged in a 2×2 configuration, with two parallel branches each containing two switches in series. Each switch has a snubber circuit connected in parallel. This arrangement combines the benefits of series and parallel connections. In some embodiments, a bleed-over circuit may be added in parallel to each switch. The series connection in each branch doubles the voltage handling capability to 1000 V, while the parallel configuration of the two branches maintains the increased current capacity of 2800 A. This design allows the solid-state switch array 260 to handle both higher voltages and currents compared to individual switches, making it suitable for high-power pulsed applications requiring increased voltage and current ratings.

A snubber capacitor 264 is connected in parallel with each solid-state switch, and a damping resistor 266 is connected in series with the snubber capacitor 264. This arrangement of components provides protection for the solid-state switches during both charging and discharging operations. In the solid-state switch array 260, the snubber capacitor 264 and damping resistor 266 form a snubber circuit connected in parallel with each solid-state switch. The snubber capacitor 264 may be configured to absorb electrical energy spikes that occur during DC discharge operations. The capacitance of the snubber capacitor 264 may be associated with characteristics of a load connected to the solid-state switch array 260, such as the plasma load.

As used herein, "characteristics of a load" may refer to the electrical properties and behavior of a device or system connected to the output of a power source. For example, characteristics of a load may encompass a wide range of electrical and physical properties that define the behavior of a device or circuit connected to a power source. These characteristics may include the load's impedance or resistance, which affects current flow, as well as its capacitance or inductance, which influence energy storage and reactive power. The power consumption or dissipation of the load, along with its specific voltage or current requirements, are crucial factors in system design. Additionally, the load's frequency response or bandwidth, nonlinear behavior or voltage-current relationship, transient response or settling time, and temperature dependence or thermal characteristics may all play significant roles in determining the overall performance and stability of the electrical system. Understanding these diverse load characteristics is essential for optimizing power delivery and ensuring proper operation of solid-state switch arrays in various applications.

The snubber circuit protects each solid-state switch from transient back electromotive force generated during DC discharge. The damping resistor 266 connected in series with the snubber capacitor 264 dissipates energy stored in the snubber capacitor 264 during switching events. Additionally, the damping resistor 266 may dampen oscillations that could occur between the snubber capacitor 264 and parasitic inductances present in the circuit. In some cases, the snubber circuit may include only the snubber capacitor 264 without the damping resistor 266. The snubber capacitor 264 alone may provide sufficient protection against transient voltages in certain applications.

The arrangement of solid-state switches in series within the solid-state switch array 260 allows for voltage stacking capabilities. When connected in series, the holdback voltages of individual solid-state switches add together, enabling the solid-state switch array 260 to handle higher overall voltages. Similarly, the parallel arrangement of switch circuits enables current sharing, allowing the solid-state switch array 260 to handle higher total currents. This modular configuration of the solid-state switch array 260, incorporating both protective elements and scalable switching capabilities, enables more reliable operation in high-voltage, high-current pulsed power applications such as plasma generation or fusion. The combination of voltage divider networks, snubber circuits, and series-parallel switch arrangements provides a balance of overvoltage protection, transient suppression, and power handling capacity.

Figure 3:
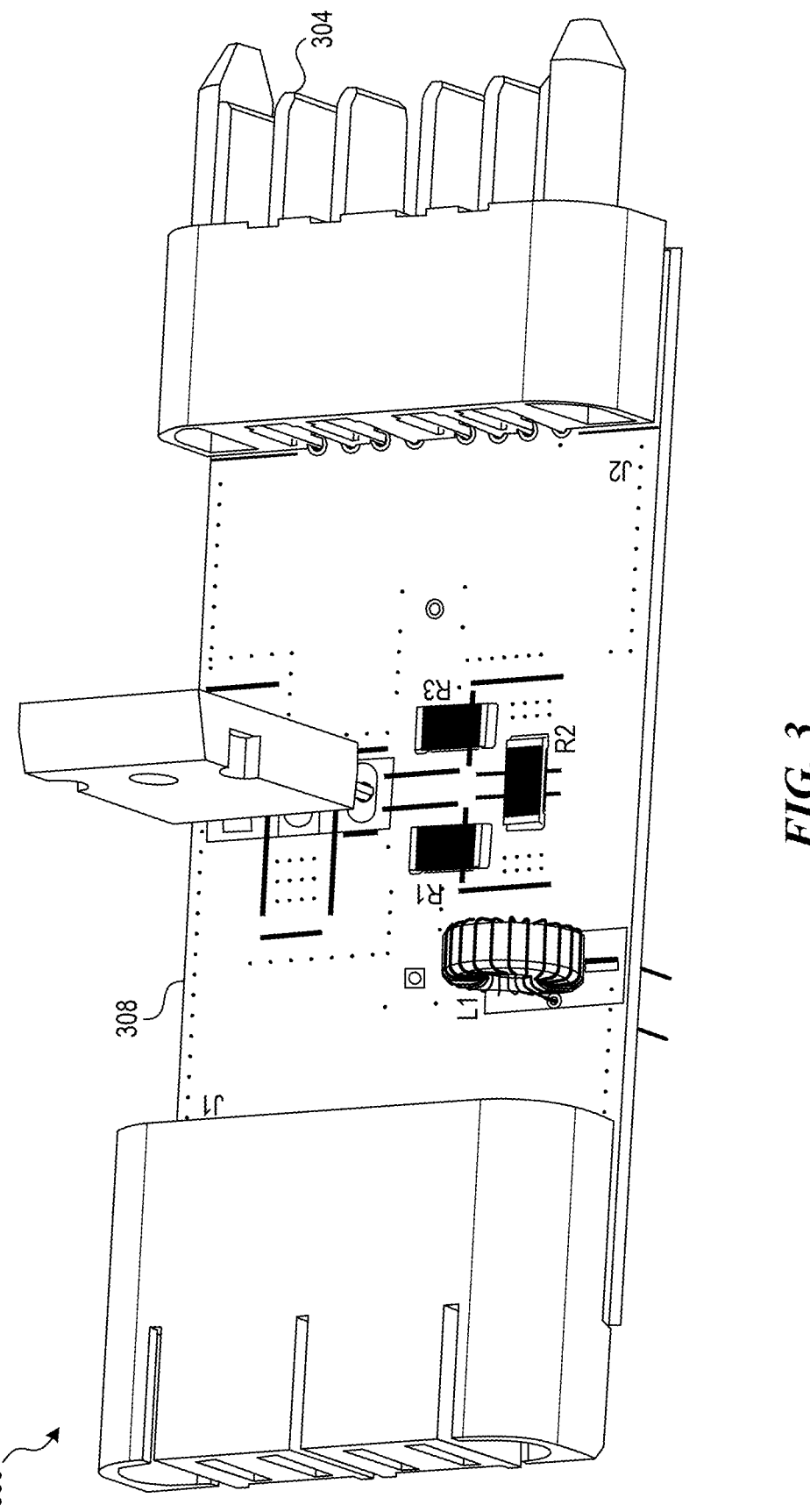
FIG. 3 illustrates a perspective view of an example modular solid-state switch assembly configured in accordance with various embodiments of the present technology.

FIG. 3 illustrates an example switch assembly 300 configured for modular and scalable solid-state switching applications. The switch assembly 300 includes a circuit board 308 that provides a mounting surface and electrical interconnections for various components. Multiple connector terminals 304 are positioned on the circuit board 308 to enable electrical connections to external components.

The circuit board 308 may be configured to accommodate various electronic components and provide a platform for integrating the switching elements into a compact form factor. In some cases, the circuit board 308 may include mounting points for attaching solid-state switches, such as thyristors or IGBTs. The solid-state switches may be arranged in series and parallel configurations on the circuit board 308 to achieve desired voltage and current handling capabilities. The connector terminals 304 may be arranged along the edges of the circuit board 308 to facilitate proper electrical connections for power input, control signals, and output connections. In some cases, the connector terminals 304 may include high-voltage terminals for connecting to a power supply and load terminals for interfacing with a plasma load or magnetic field generation system.

The switch assembly 300 may incorporate protective circuitry directly on the circuit board 308. This may include voltage divider networks with bleed-over resistors connected in parallel with each solid-state switch to distribute voltage during charging operations. Snubber circuits including protection capacitors and damping resistors may also be integrated onto the circuit board 308 to protect the solid-state switches from transient back electromotive force during discharge events. In some implementations, the switch assembly 300 may include a ferrite core assembly mounted on the circuit board 308. The ferrite core assembly may provide simultaneous triggering of multiple solid-state switches through gate control wiring connected to the connector terminals 304. This configuration may enable coordinated switching behavior across the entire switch assembly 300.

The modular design of the switch assembly 300 may allow for scalable implementation where multiple assemblies can be combined to achieve higher voltage and current ratings. In some cases, the switch assembly 300 may be configured as a plug-and-play component that can be integrated into larger power systems for plasma generation or pulsed magnetic field applications. Pulsed magnetic field applications may include magnetic confinement fusion, particle beam focusing, materials science research, and medical imaging. In fusion experiments, pulsed magnetic fields can compress and heat plasma, while in materials science, they enable studies of high-field effects on materials. The switch assembly 300 may be designed for use in pulsed DC power applications. The arrangement of components on the circuit board 308 and the configuration of the connector terminals 304 may enable the switch assembly 300 to be used for driving a plasma gun or for generating a pulsed magnetic field. The modular nature of the switch assembly 300 allows for customization and expansion to meet various power handling requirements in plasma physics and fusion applications.

Figure 4:
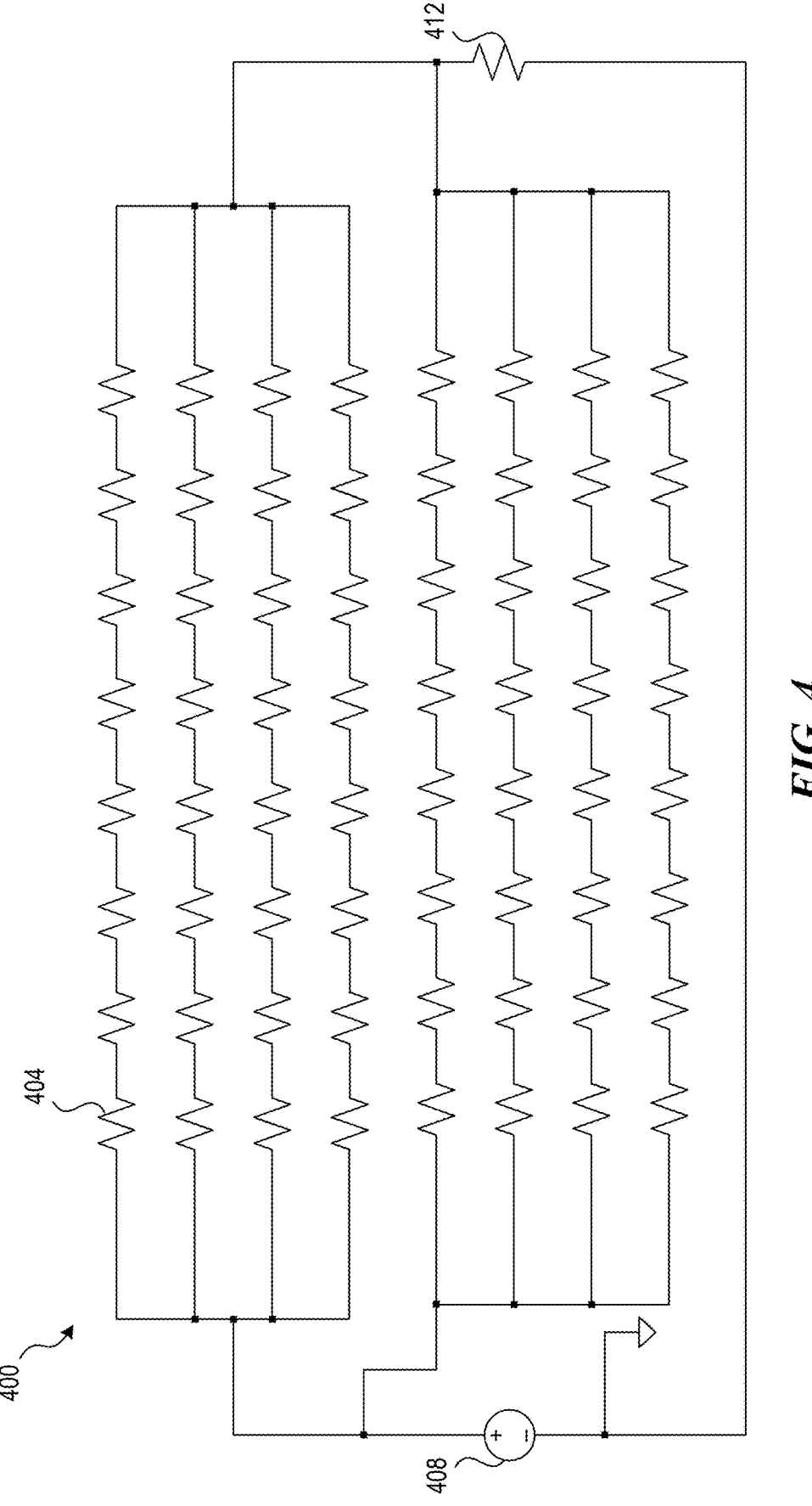
FIG. 4 illustrates an example modular solid-state switch array configured in accordance with various embodiments of the present technology.

FIG. 4 illustrates an example modular solid-state switch array 400 for high-voltage pulsed power applications. The solid-state switch array 400 includes multiple solid-state switches arranged in series and parallel configurations. The solid-state switching elements are arranged in an 8×3 configuration with two parallel branches, creating 48 total switching elements distributed across the grid pattern. A corresponding bleed-over resistor 404 (sometimes referred to as a passover resistor) is connected in parallel with each solid-state switch in the solid-state switch array 400. The solid-state switch array 400 is connected to a power supply 408. A load balance resistor 412 is connected across a load of the solid-state switch array 400.

The bleed-over resistors 404 allow current to bypass the solid-state switches during charging operations. In some cases, each bleed-over resistor is configured to receive a constant current flow from the power supply 408 during the charging operation. The bleed-over resistors 404 can be configured to divert leakage currents around the solid-state switches during the charging operation. The load balance resistor 412 helps distribute voltage between the solid-state switch array 400 and the load. In some cases, the load balance resistor 412 may have a resistance associated with a total resistance of the resistor circuits connected in parallel with the solid-state switches. The load balance resistor 412 may be configured to control voltage distribution between the solid-state switch array 400 and the load. The load balance resistor 412 is sometimes referred to as a Paschen breakover resistor. This resistor can be designed, e.g., to prevent plasma chamber breakdown by controlling the voltage distribution between the solid-state switch array 400 and a plasma chamber. Its resistance value can be determined based on the total resistance of the bleed-over resistor circuits in the solid-state switch array, providing voltage control across both the solid-state switch array 400 and the plasma chamber. This balancing enables the operation of the solid-state switch array 400 in plasma applications, where voltage control maintains stable plasma conditions.

The power supply 408 provides DC voltage to charge the system. When voltage is applied by the power supply 408, current may flow through either a switch or a bleed-over resistor path. The load balance resistor 412 provides a path to ground and can control the voltage division between components during operation. The components in the modular solid-state switch array circuit 400 are arranged to enable controlled discharge of current through the solid-state switch array 400 while maintaining appropriate voltage distribution across the components. This configuration enables control of high-voltage, high-current pulses for applications such as plasma generation or pulsed magnetic field production.

Current determinations through each resistor in the array can be performed to verify sufficient wattage ratings. For example, these determinations can take into account the maximum expected current flow during both charging and discharging operations, such that each resistor can handle the power dissipation without failure. The wattage verification process maintains the long-term reliability and performance of the solid-state switch array 400, particularly in high-power pulsed applications where momentary current spikes can be significant. By compatibility with adequate wattage ratings, the design of the solid-state switch array 400 mitigates the risk of resistor failure due to overheating, which could otherwise lead to cascading failures across the switch array. In some implementations, each bleed-over circuit may be a series combination of resistors that combine to a desired wattage based on desired voltage and bleed-over current.

An LTspice simulation can be performed for the solid-state switch array 400 for detailed analysis of voltage distribution, current flow, and transient responses across the entire solid-state switch array 400. This modeling approach can improve the array configuration, fine-tune component values, and predict system behavior under various operating scenarios before physical implementation. The simulation results can provide insights into the dynamic equilibrium of the system, helping to identify potential issues such as voltage imbalances or current hotspots that could compromise the reliability or performance of the solid-state switch array 400 in demanding plasma physics and fusion applications.

Figure 5:
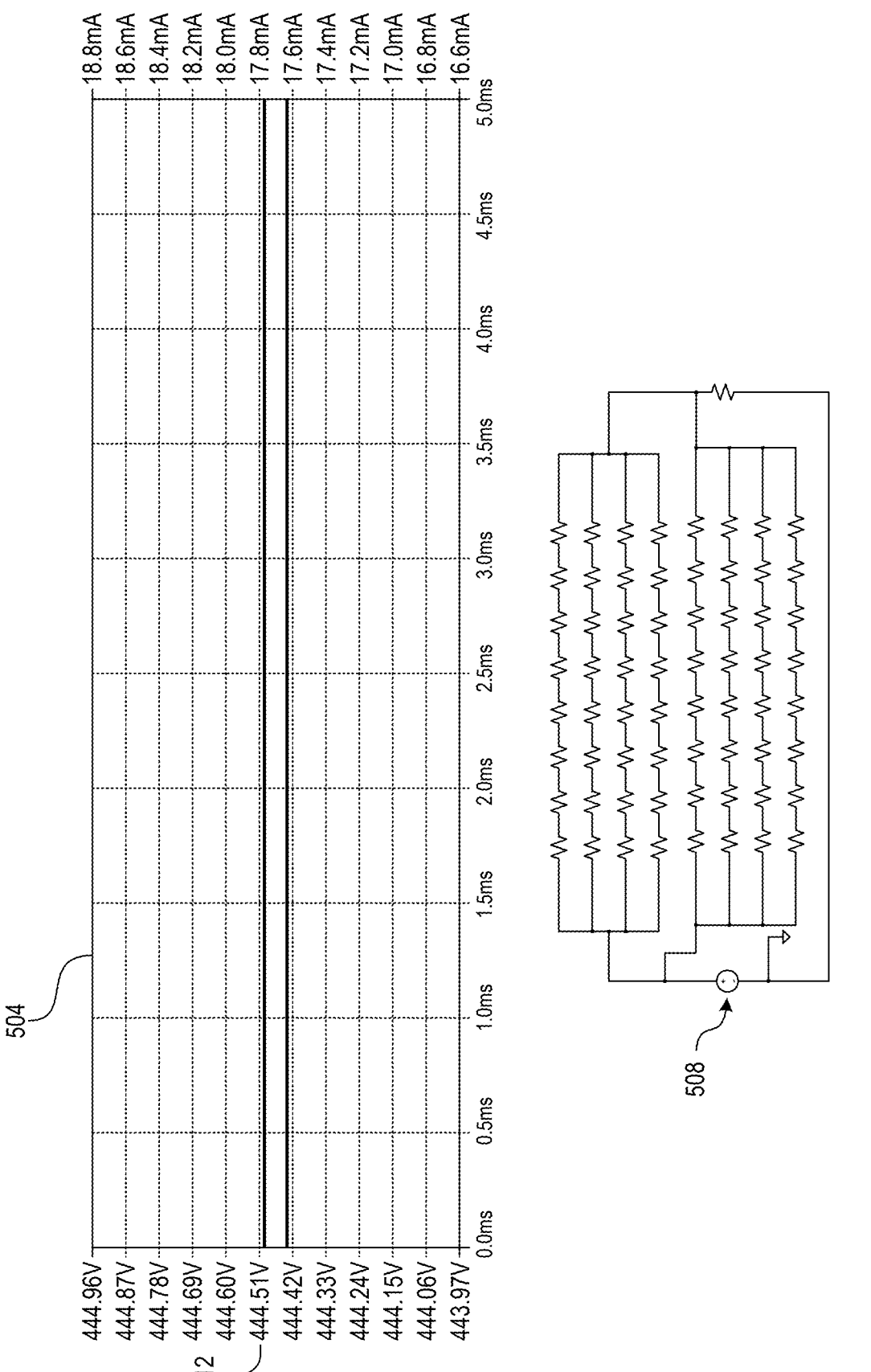
FIG. 5 illustrates an example simulation of the modular solid-state switch array of FIG. 4 configured in accordance with various embodiments of the present technology.

FIG. 5 illustrates an example simulation 504 of a modular solid-state switch array 508 for high-voltage pulsed power applications. The simulation 504 displays voltage characteristics 512 over time, demonstrating the electrical behavior of the switch array 508 during charging and discharge cycles.

The simulation 504 addresses multiple solid-state switches arranged in series and parallel configurations within the switch array 508. Each solid-state switch in the array 508 may be associated with a corresponding resistor circuit connected in parallel. These resistor circuits may be configured to distribute voltage across the solid-state switches during a charging operation to prevent an overvoltage condition. In some cases, the resistor circuits in the simulation 504 may have resistances associated with bleed-over current characteristics of the solid-state switches during potential overvoltage conditions. The simulation 504 may model how the solid-state switches in the array 508 hold back a DC voltage supplied by a charged capacitor during the charging operation.

The voltage waveform displayed in the simulation 504 shows detailed characteristics over time, including the behavior during charging and discharge phases. The switch array 508 may incorporate 200 kilo ohm bleed-over resistors positioned in parallel with each solid-state switch to create a voltage divider network that prevents overvoltage conditions during charging phases. Among the components analyzed in the simulation 504 may be a balance resistor positioned across a plasma discharge chamber. This balance resistor may prevent unwanted breakdown during the charging phase. The simulation 504 may determine voltage levels across this balance resistor to ensure operation below the breakdown threshold of a plasma generator.

The simulation 504 enables analysis of power dissipation characteristics for the balance resistor. The resistance value of the balance resistor may be dynamically adjusted based on the specific switch array 508 configuration. As more switches are added in parallel, the overall system resistance decreases, necessitating redetermination of the plasma chamber bleed-over resistance. By modeling the resistor balance across load discharges, the simulation 504 validates resistor balancing for system reliability and performance in plasma physics applications. Without adequate resistor balancing, the chamber may experience premature sparking during charging, potentially preventing the system from reaching target voltages and causing damage to the switch array 508.

The simulation 504 allows for analysis of voltage distribution, current flow, and transient responses across the entire switch array 508. This modeling approach enables improved design of the array configuration, fine-tuning of component values, and prediction of system behavior under various operating scenarios before physical implementation. Results from the simulation 504 can provide insights into the dynamic equilibrium of the system, helping to identify potential issues such as voltage imbalances or current hotspots that could compromise the reliability or performance of the solid-state switch array 508 in demanding plasma physics and fusion applications.

Figure 6:
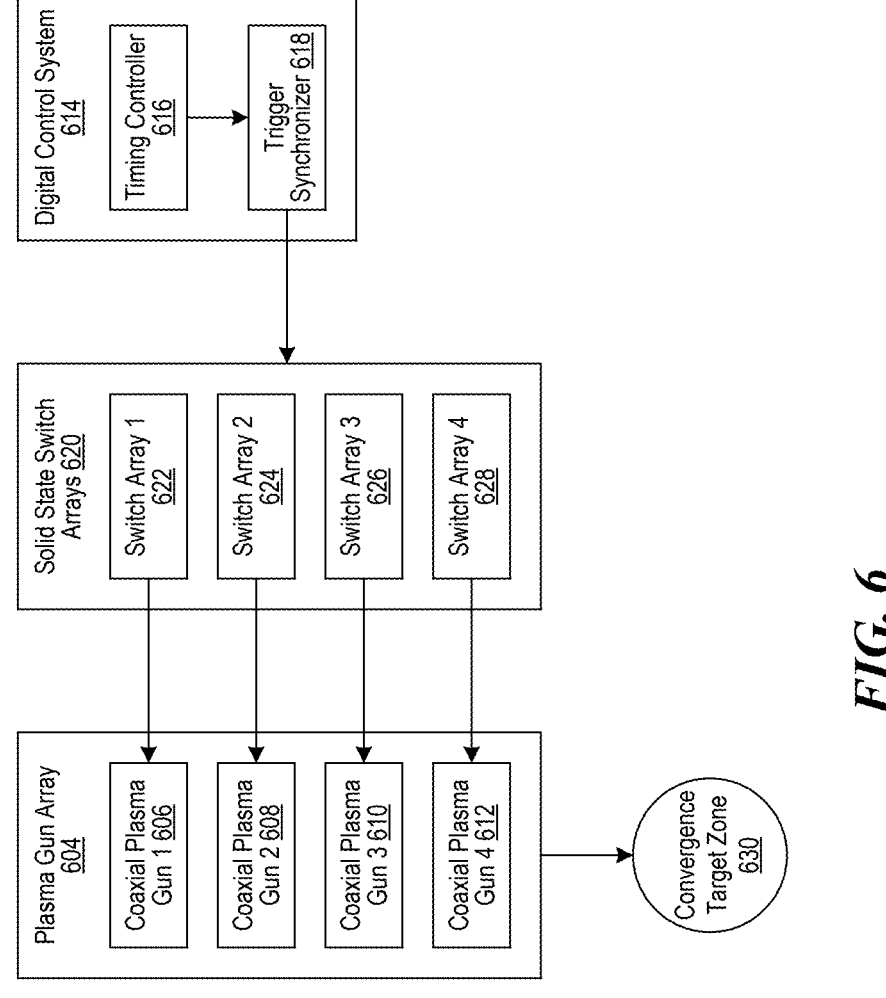
FIG. 6 illustrates an example digitized plasma magneto-inertial fusion system configured in accordance with various embodiments of the present technology.

Selected Embodiments of Digitized Plasma Control and Magneto-Inertial Fusion Applications, and Associated Systems, Devices, and Methods FIG. 6 illustrates a system diagram of a digitized plasma magneto-inertial fusion system 600. Components of the digitized plasma magneto-inertial fusion system 600 can be implemented using computer hardware, software, firmware, or a combination thereof. As shown, the digitized plasma magneto-inertial fusion system 600 includes a vacuum chamber 602, a plasma gun array 604, a digital control system 614, solid state switch arrays 620, and a convergence target zone 630 (sometimes referred to as a convergence point or a parametrically-defined convergence volume). The digitized plasma magneto-inertial fusion system 600 can further include a timing controller 616, a trigger synchronizer 618, switch array 1 622, switch array 2 624, switch array 3 626, switch array 4 628, coaxial plasma gun 1 606, coaxial plasma gun 2 608, coaxial plasma gun 3 610, and coaxial plasma gun 4 612.

The vacuum chamber 602 provides a controlled environment for plasma operations and magneto-inertial fusion reactions. The vacuum chamber 602 may be configured to maintain low pressure conditions that enable plasma formation and propagation without interference from atmospheric gases. The vacuum chamber 602 may be configured for variable pressure control and plasma characteristics for different experimental conditions. In some cases, the vacuum chamber 602 is configured to contain the plasma convergence events and provide containment for fusion reactions. The vacuum chamber 602 may include viewing ports and diagnostic access points for monitoring plasma behavior during fusion operations.

The plasma gun array 604 includes multiple electromagnetic particle accelerators configured to generate and direct plasma streams toward the convergence target zone 630. An electromagnetic particle accelerator may be a device that generates and directs high-velocity plasma streams or particle beams. It may utilize electromagnetic forces to accelerate charged particles or plasma to high speeds, typically for applications in fusion research, plasma physics experiments, or simulating hypersonic flight conditions. These accelerators may include coaxial plasma guns, which use coaxial electrode configurations and snowplow acceleration mechanisms, or linear railguns that employ parallel conducting rails to accelerate plasma via Lorentz forces. The plasma gun array 604 includes coaxial plasma gun 1 606, coaxial plasma gun 2 608, coaxial plasma gun 3 610, and coaxial plasma gun 4 612 arranged to provide directional plasma outputs. The plasma gun array 604 may be positioned to converge corresponding plasma discharges toward a parametrically-defined volume within the vacuum chamber 602. In some cases, the plasma gun array 604 may be configured with magnetic field generation capability for plasma direction control to enhance convergence precision. The plasma gun array 604 may be configured for hypersonic testing applications where plasma streams simulate atmospheric conditions encountered by hypersonic vehicles.

The digital control system 614 coordinates the operation of the plasma gun array 604 through timing control mechanisms. The digital control system 614 includes the timing controller 616 and the trigger synchronizer 618 that work together to achieve synchronized plasma generation. The timing controller 616 may be configured to determine operational parameters for the electromagnetic particle accelerators based on parametric inputs defining three-dimensional coordinates of the convergence target zone 630. The digital control system 614 may receive the parametric inputs defining three-dimensional coordinates of a convergence point within a vacuum chamber. The digital control system may receive parametric inputs including vacuum chamber dimensions and electromagnetic particle accelerator positions. These inputs define the spatial constraints and accelerator layout within the chamber. These inputs specify the precise location where plasma streams from multiple electromagnetic accelerator modules 1204*a-h* should converge. The digital control system 614 can use these coordinates to calculate timing offsets and operational parameters for each module, providing synchronized plasma convergence at the defined point. The digital control system 614 can also use this information to determine three-dimensional coordinates for each accelerator module relative to a convergence point, enabling more accurate timing offsets and operational parameters for synchronized plasma convergence. The trigger synchronizer 618 may be configured to transmit trigger signals to the solid state switch arrays 620 based on determined timing offsets. In some cases, the digital control system 614 may be configured to determine trigger breakdown time for each solid state switch array by measuring duration from initiation of control signal to plasma formation. The timing controller 616 and the trigger synchronizer 618 can be implemented using computer hardware, software, firmware, or a combination thereof.

The solid state switch arrays 620 include multiple switching modules that control the electromagnetic particle accelerators in the plasma gun array 604. The solid state switch arrays 620 include switch array 1 622, switch array 2 624, switch array 3 626, and switch array 4 628 that correspond to the individual plasma guns. The solid state switch arrays 620 may be configured to control corresponding electromagnetic particle accelerators through high-voltage pulsed power delivery. Each solid state switch array may be configured to receive trigger signals from the digital control system 614 and convert those signals into high-power electrical discharges that drive plasma formation. In some cases, the solid state switch arrays 620 may incorporate the voltage divider network, the snubber circuit network, and the ferrite core gate driver described in connection with the solid state switch array system 100.

The convergence target zone 630 serves as the focal point where plasma streams from the plasma gun array 604 converge to achieve magneto-inertial fusion reactions. The convergence target zone 630 may be parametrically-defined based on the three-dimensional positioning and directional characteristics of the electromagnetic particle accelerators. The convergence target zone 630 may be configured to enable simultaneous convergence of plasma discharges from multiple plasma guns to achieve the energy densities and confinement conditions for fusion reactions. In some cases, the convergence target zone 630 may be configured to achieve, e.g., Q>1 energy output ratio where the fusion energy output exceeds the input energy provided to the digitized plasma magneto-inertial fusion system 600.

The digitized plasma magneto-inertial fusion system 600 operates through coordinated control of plasma generation and timing convergence. The digital control system 614 may determine operational parameters for the electromagnetic particle accelerators including three-dimensional position coordinates, output direction vectors, output angles, and output velocities relative to the convergence target zone 630. The digital control system 614 may determine timing offsets between triggers of the electromagnetic particle accelerators based on the operational parameters to cause simultaneous convergence of outputs at the convergence target zone 630. In some cases, the digitized plasma magneto-inertial fusion system 600 may be configured to generate timing profiles for each electromagnetic particle accelerator based on empirically measured trigger breakdown times. The digital control system may store timing profiles for each electromagnetic accelerator module based on empirically measured trigger breakdown times of their associated solid-state switch arrays. The stored profiles enable precise calculation of timing offsets for synchronized plasma convergence at the parametrically-defined point.

The connection relationships within the digitized plasma magneto-inertial fusion system 600 enable coordinated plasma convergence operations. Switch array 1 622 connects to coaxial plasma gun 1 606, switch array 2 624 connects to coaxial plasma gun 2 608, switch array 3 626 connects to coaxial plasma gun 3 610, and switch array 4 628 connects to coaxial plasma gun 4 612. The digital control system 614 communicates with each of the solid state switch arrays 620 to provide synchronized triggering signals. In some cases, the digitized plasma magneto-inertial fusion system 600 may be configured as a digital control apparatus including the vacuum chamber 602 housing enclosing the parametrically-defined convergence target zone 630 with multiple pulsed power driven electromagnetic particle accelerators positioned to direct outputs toward the convergence target zone 630.

Figure 7:
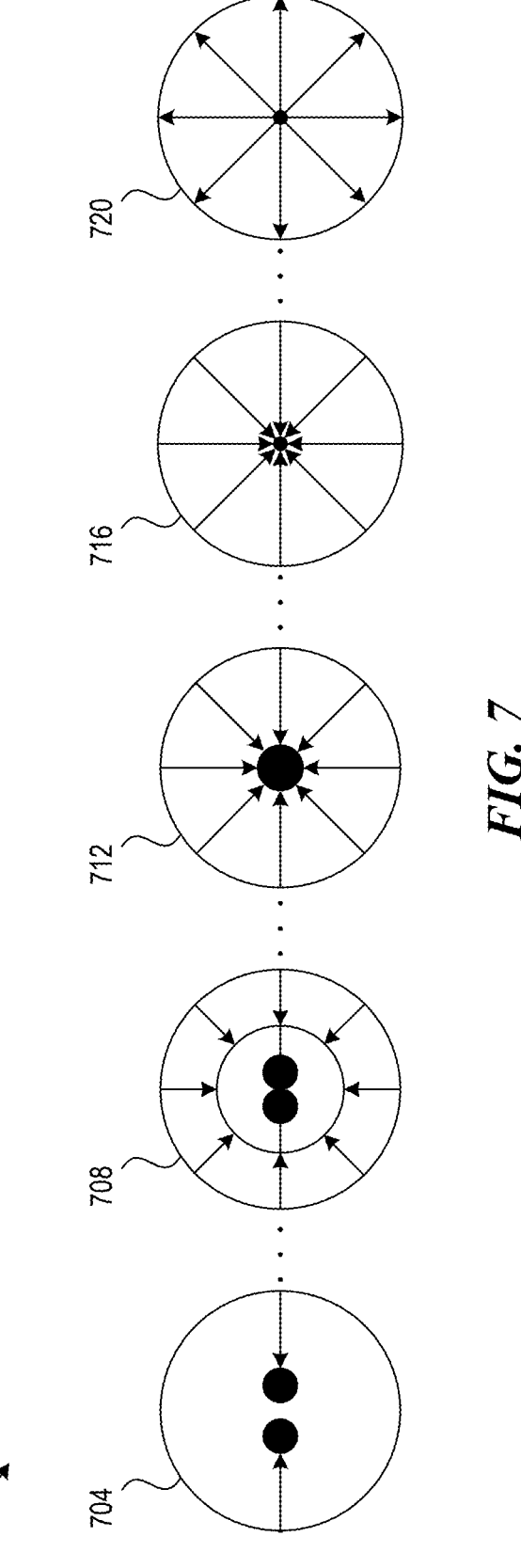
FIG. 7 illustrates an example time lapse sequence of digitized plasma magneto-inertial fusion in accordance with various embodiments of the present technology.

FIG. 7 illustrates an example time lapse sequence 700 of digitized plasma magneto-inertial fusion. The time lapse sequence 700 includes five stages: an initial plasma stage 704, a plasma liner formation stage 708, a compression stage 712, a fusion temperature stage 716, and a neutron emission stage 720.

In the initial plasma stage 704, a target plasma may be compressed by a liner. A solid state switch array may control electromagnetic particle accelerators to generate plasma discharges that converge at a parametrically-defined target volume or location. A voltage divider network and snubber circuit network may protect the solid-state switches during high-power discharge operations. Target plasma fire can be initiated at the center of a spherical chamber using two or more diametrically positioned electromagnetic particle accelerators. In some embodiments, only one electromagnetic particle accelerator may be used. Coaxial plasma guns, controlled by solid-state switch arrays, can generate plasma discharges that converge at a parametrically-defined target location. Stage 704 precedes plasma liner compression, where multiple plasma sources around the sphere's periphery create radial inward-directed plasma formation for magneto-inertial fusion reactions. In some cases, electromagnetic particle accelerators direct plasma streams toward a central convergence point to initiate compression of fusion fuel materials. As used herein, a "plasma stream" refers to a directed flow of ionized gas generated and accelerated by electromagnetic particle accelerators. It may achieve Mach-speed velocities and can be used for fusion experiments, hypersonic testing, or other high-energy physics applications.

During the plasma liner formation stage 708, multiple electromagnetic particle accelerators positioned around the spherical chamber's periphery may activate as plasma liner sources. A ferrite core gate driver may provide simultaneous triggering across multiple switches with sub-microsecond precision. The solid state switch array may deliver high-voltage, high-current pulses through thyristor-based switching elements arranged in series and parallel configurations.

As the initial target plasma approaches collision at the center, the digital control system coordinates simultaneous firing of coaxial plasma guns through solid-state switch arrays. A timing controller and trigger synchronizer can determine timing offsets to compensate for individual accelerator characteristics for synchronized plasma liner formation. The plasma liner creates radial inward-directed plasma streams that converge toward the central target location. Each electromagnetic particle accelerator can be controlled by solid-state switches arranged in series and parallel configurations, enabling high-voltage, high-current pulsed power delivery. A ferrite core gate driver can provide simultaneous triggering across multiple switches with sub-microsecond precision. This coordinated plasma liner compression occurs as the target plasma nears collision, creating the external shell for achieving fusion-relevant temperature, density, and confinement time parameters through the digitally controlled convergence of multiple plasma streams at the parametrically-defined convergence target zone.

In the compression stage 712, the target plasma may be compressed by the plasma liner through coordinated electromagnetic particle accelerator operation. The solid state switch array may synchronize multiple coaxial plasma guns positioned around the spherical chamber to create radial inward compression forces on the central target plasma. The ferrite core assembly may provide coordinated switching across multiple thyristors with sub-microsecond precision. The solid-state switch arrays deliver high-voltage, high-current pulses through switching elements arranged in series and parallel configurations. The timing controller can determine precise timing offsets to compensate for individual accelerator trigger breakdown times and plasma propagation velocities, providing simultaneous convergence at the parametrically-defined target location.

The ferrite core gate driver can provide coordinated switching across multiple thyristors with sub-microsecond precision. As the plasma liner converges inward, it compresses the target plasma toward fusion-relevant conditions. The compression process can use the snowplow plasma acceleration mechanism within each coaxial plasma gun, generating Mach-speed plasma velocities. In some implementations, the coaxial plasma guns use torsional magnetic reconnection as a discharge method to generate and accelerate plasma. The torsional magnetic reconnection process may involve the rapid reconfiguration of magnetic field lines, resulting in the conversion of magnetic energy into kinetic and thermal energy of the plasma. This approach may enhance plasma acceleration and confinement, potentially improving the overall efficiency and performance of the digitized plasma magneto-inertial fusion system. The voltage divider networks and snubber circuit networks protect the solid-state switches during the high-power discharge operations required for this compression phase, enabling more reliable plasma liner formation for magneto-inertial fusion applications.

The fusion temperature stage 716 includes compression achieving fusion-relevant temperature, density, and confinement time through coordinated plasma convergence. The solid state switch array may synchronize multiple electromagnetic particle accelerators positioned radially around the spherical chamber. The protection capacitors and damping resistors may protect the solid-state switches during high-power discharge operations. For example, the digital control system synchronizes multiple electromagnetic particle accelerators positioned radially around the spherical chamber, with each coaxial plasma gun controlled by solid-state switch arrays containing switching elements in series and parallel configurations. The timing controller determines precise timing offsets based on empirically measured trigger breakdown times and plasma propagation velocities, providing simultaneous convergence at the parametrically-defined target location. The ferrite core gate driver delivers coordinated voltage pulses to sold-switch gates with sub-microsecond precision, enabling synchronized plasma compression.

In the neutron emission stage 720, isotropic neutron emission from fusion reactions provides output energy. The solid state switch array, controlled by the ferrite core gate driver, may enable the synchronized plasma compression necessary to reach fusion-relevant temperature, density, and confinement time. The switching elements in series and parallel configurations may deliver the high-voltage, high-current pulses required for plasma acceleration. The digital control system's coordination of multiple electromagnetic particle accelerators achieves the Lawson criterion conditions, resulting in fusion reactions that emit neutrons uniformly in all directions from the central convergence target zone. The solid-state switch arrays, controlled by the timing controller and trigger synchronizer, enable the synchronized plasma compression necessary to reach fusion-relevant temperature, density, and confinement time.

The isotropic neutron emission pattern indicates successful fusion reactions, with neutrons radiating outward from the compressed plasma core. This energy output represents the achievement of Q>1 conditions where fusion energy exceeds input energy. The neutron detectors positioned around the spherical chamber measure the emission characteristics, validating the timing capabilities of the digitized plasma magneto-inertial fusion system for potential power plant applications through controlled energy extraction from the fusion process.

The time lapse sequence 700 demonstrates the temporal progression from initial plasma formation through compression, fusion reaction, and energy extraction phases of the digitized plasma magneto-inertial fusion process. The sequence 700 shows how electromagnetic particle accelerators coordinate their plasma outputs to achieve synchronized convergence at parametrically-defined target locations. In some cases, the sequence 700 illustrates the transition from plasma acceleration through target compression to fusion ignition and energy release phases that characterize magneto-inertial fusion operations.

Figure 8:
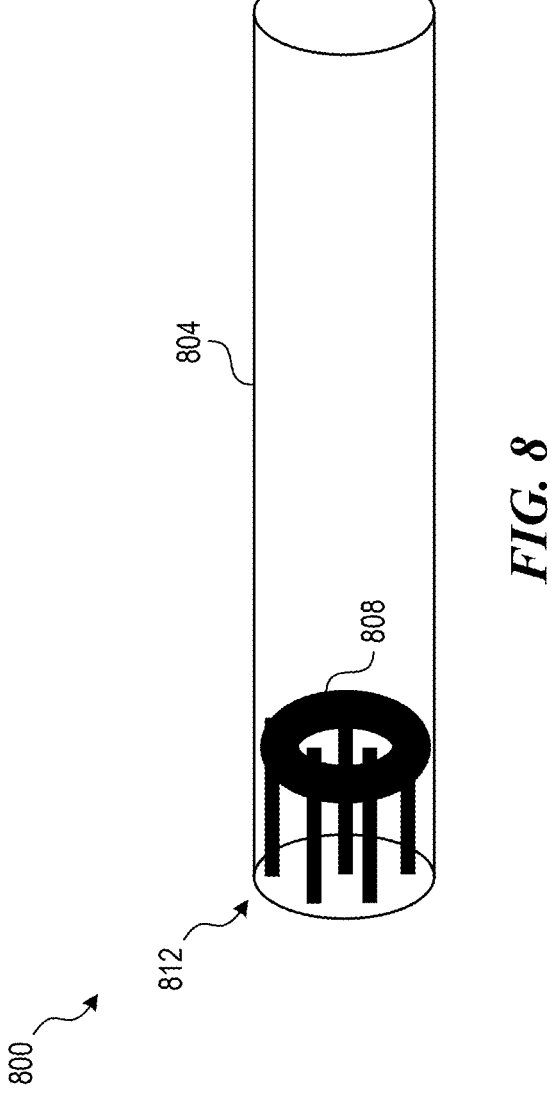
FIG. 8 illustrates a perspective view of an example coaxial plasma gun assembly configured in accordance with various embodiments of the present technology.

FIG. 8 illustrates an example coaxial plasma gun assembly 800 configured for generating and directing plasma for fusion applications. The coaxial plasma gun assembly 800 includes a cylindrical chamber 804, a plasma sheath 808, and a coaxial gun 812.

The cylindrical chamber 804 provides containment for plasma generation and propagation. In some cases, the cylindrical chamber 804 maintains specific pressure conditions that enable plasma formation without interference from atmospheric gases. The cylindrical chamber 804 may be fabricated from materials providing electrical insulation and mechanical durability for high-power plasma operations. The coaxial gun 812 is positioned within the cylindrical chamber 804. In some cases, the coaxial gun 812 is configured to generate plasma discharges that propagate through the cylindrical chamber 804 in a controlled manner. The coaxial gun 812 may connect to the solid state switch array to receive high-voltage pulsed power for plasma generation operations.

The plasma sheath 808 surrounds the coaxial gun 812 structure within the cylindrical chamber 804. In some cases, the plasma sheath 808 is configured to guide the plasma discharge in a specific direction to achieve controlled plasma propagation. The plasma sheath 808 may interact with the plasma discharge to create a pushing effect that accelerates the plasma to high velocities. In some implementations, the coaxial plasma gun assembly 800 uses torsional magnetic reconnection for plasma generation and acceleration. This process involves the creation of twisted magnetic field lines within the plasma, which can rapidly reconfigure and release stored magnetic energy. The sudden reconfiguration of these twisted field lines may result in the conversion of magnetic energy into kinetic and thermal energy of the plasma, potentially enhancing acceleration and confinement. Other components may be included in creating the plasma discharge (e.g., magnetic coils).

The plasma generation process within the coaxial plasma gun assembly 800 begins when the solid state switch array delivers high-power electrical pulses to the coaxial gun 812. The plasma discharge may form between electrode elements of the coaxial gun 812 and propagate through the cylindrical chamber 804 under the influence of the plasma sheath 808. In some cases, the plasma generation process may achieve plasma velocities in the Mach speed range through the acceleration effects of the plasma sheath 808. The coaxial plasma gun assembly 800 may be designed for repeated discharge operations with consistent plasma characteristics. In some cases, the coaxial plasma gun assembly 800 is configured for use in digitized plasma magneto-inertial fusion systems where multiple assemblies operate in coordinated fashion to achieve plasma convergence at parametrically-defined target locations.

Figure 9:
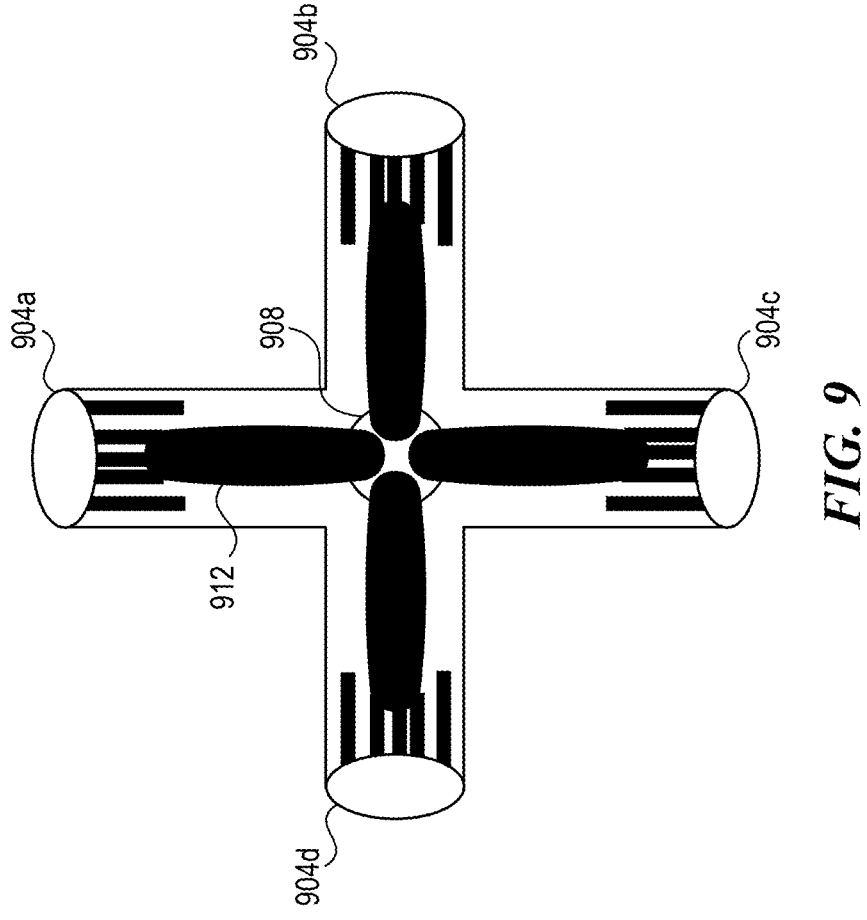
FIG. 9 illustrates four example electromagnetic particle accelerators configured in accordance with various embodiments of the present technology.

FIG. 9 illustrates a top view of four example electromagnetic particle accelerators 904a-d arranged in a systematic configuration designed to enable coordinated convergence of plasma streams. The electromagnetic particle accelerators may be positioned at specific locations relative to a central convergence point 908 to facilitate synchronized plasma discharge operations for magneto-inertial fusion applications. FIG. 9 depicts a plasma generation phase.

The electromagnetic particle accelerators 904a-d can include coaxial plasma guns or linear railguns. Coaxial plasma guns use a cylindrical chamber with electrodes arranged coaxially, enabling plasma formation and acceleration through electromagnetic forces. These guns may employ snowplow plasma acceleration or torsional magnetic reconnection for plasma generation. Linear railguns use parallel conducting rails to accelerate plasma or projectiles via Lorentz forces, achieving high velocities suitable for fusion applications.

A first electromagnetic particle accelerator 904a may be positioned at the top of the arrangement. A second electromagnetic particle accelerator 904b may be positioned to the right side of the arrangement. A third electromagnetic particle accelerator 904c may be positioned at the bottom of the arrangement. A fourth electromagnetic particle accelerator 904d may be positioned to the left side of the arrangement. The electromagnetic particle accelerators 904a-d may be arranged symmetrically around a central convergence point 908. Each electromagnetic particle accelerator may have distinct three-dimensional positioning coordinates that define the spatial relationship between the accelerator and the target convergence location. The electromagnetic particle accelerators may be oriented with specific output direction vectors and angles that determine the trajectory of plasma streams generated during discharge operations. A plasma stream 912 is shown emanating from the first electromagnetic particle accelerator 904a. In some cases, each of the electromagnetic particle accelerators 904a-d is configured to generate and direct a plasma stream toward the central convergence point 908.

The electromagnetic particle accelerators 904a-d may be configured with individual operational characteristics that enable control of plasma generation and direction. Each electromagnetic particle accelerator may have distinct three-dimensional positioning coordinates that define the spatial relationship between the accelerator and the target convergence location. The electromagnetic particle accelerators 904a-d may be oriented with specific output direction vectors and angles that determine the trajectory of plasma streams generated during discharge operations.

In some cases, the electromagnetic particle accelerators 904a-d are configured to produce plasma outputs with measurable velocities that can be characterized for timing control purposes. A solid state switch array may be configured to control corresponding electromagnetic particle accelerators through high-voltage pulsed power delivery. The arrangement of electromagnetic particle accelerators 904a-d may enable scalable plasma convergence operations where the number of accelerators can be adjusted based on specific application requirements. The configuration may provide redundancy and enhanced plasma density at the convergence location through the coordinated operation of multiple electromagnetic particle accelerators.

In some implementations, a ferrite core gate driver is configured to deliver coordinated voltage pulses to thyristor gates across the electromagnetic particle accelerators 904a-d with sub-microsecond precision. The voltage divider network and snubber circuit network illustrated and described in more detail with reference to FIGS. 1-5 may protect the solid-state switches during the high-power discharge operations required for plasma generation. The configuration of electromagnetic particle accelerators 904a-d may enable simultaneous convergence of plasma streams at the parametrically-defined convergence point 908. This coordinated convergence may be achieved through precise timing control provided by the solid state switch array and associated digital control systems.

A digital control system may be configured to determine operational parameters for the electromagnetic particle accelerators based on the spatial arrangement shown in FIG. 9. The operational parameters may include three-dimensional positions that define the exact location of each electromagnetic particle accelerator relative to the convergence point. The operational parameters may further include output direction vectors and angles that specify the directional characteristics of plasma streams generated by each electromagnetic particle accelerator. In some cases, the operational parameters may include output velocities that characterize the speed at which plasma streams propagate from each electromagnetic particle accelerator toward the convergence location.

The digital control system may be configured to determine digital timing offsets between triggers of the electromagnetic particle accelerators based on the operational parameters to achieve simultaneous convergence of outputs. For example, electromagnetic particle accelerator 904a can be associated with a trigger T1, electromagnetic particle accelerator 904b can be associated with a trigger T2, electromagnetic particle accelerator 904c can be associated with a trigger T3, and electromagnetic particle accelerator 904d can be associated with a trigger T4. The digital timing offsets can compensate for variations in plasma propagation delays that result from different distances between individual electromagnetic particle accelerators and the convergence target location. The digital timing offsets may account for differences in plasma velocities that may occur due to variations in the operational characteristics of individual electromagnetic particle accelerators. In some cases, the digital timing offsets may be determined to ensure that plasma streams from all four electromagnetic particle accelerators arrive at the convergence location within the same temporal window.

A digital control system may be configured to trigger the electromagnetic particle accelerators according to the determined digital timing offsets to cause the outputs to converge at the parametrically-defined convergence point 908. The simultaneous triggering may involve sending control signals to solid-state switch arrays that provide high-voltage pulsed power to each electromagnetic particle accelerator. The timing of the control signals may be adjusted based on the determined digital timing offsets to compensate for the individual characteristics of each electromagnetic particle accelerator. In some cases, the digital control system may coordinate the triggering sequence to ensure that plasma streams from all four electromagnetic particle accelerators converge simultaneously despite variations in their individual trigger breakdown times and plasma propagation characteristics.

Figure 10:
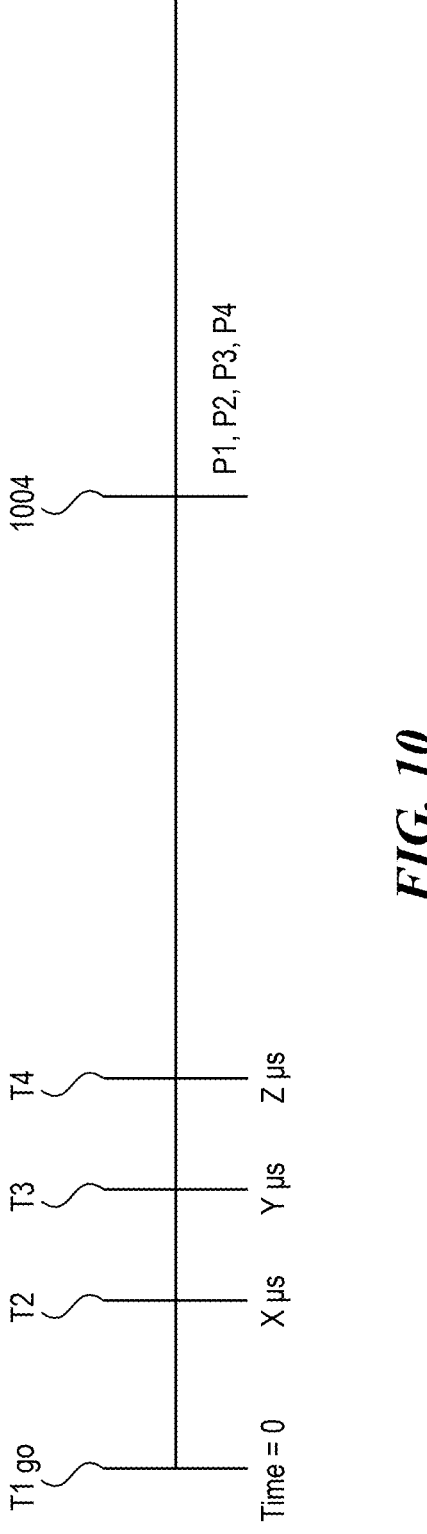
FIG. 10 illustrates an example digital control system's trigger balancing and synchronizing phase for converging multiple electromagnetic particle accelerators in accordance with various embodiments of the present technology.

FIG. 10 illustrates an example trigger balancing and synchronizing phase for converging multiple electromagnetic particle accelerators. The figure depicts a reference time Time=0, a first trigger signal T1, a second trigger signal T2, a third trigger signal T3, a fourth trigger signal T4, and timing for a first plasma stream P1, a second plasma stream P2, a third plasma stream P3, a fourth plasma stream P4, and a convergence time 1004.

The first trigger signal T1 (e.g., associated with the first electromagnetic particle accelerator 904a illustrated and described in more detail with reference to FIG. 9) initiates at the reference time Time=0 as a normalized reference point for the slowest trigger breakdown time. The second trigger signal T2, the third trigger signal T3, and the fourth trigger signal T4 represent sequential timing intervals (X µs, Y µs, Z µs) determined based on empirically measured plasma velocity, distance to goal convergence, and/or individual trigger breakdown times for each solid-state switch array.

The digital control system may determine precise timing offsets for the first trigger signal T1, the second trigger signal T2, the third trigger signal T3, and the fourth trigger signal T4 to compensate for individual trigger breakdown times and plasma propagation velocities. Each solid-state switch array in the solid state switch array may control a corresponding coaxial plasma gun, with the timing controller determining when each accelerator fires to achieve synchronized convergence.

In some cases, a timing controller determines digital timing offsets to compensate for variations between electromagnetic particle accelerators, providing simultaneous plasma convergence at a parametrically-defined volume. A ferrite core gate driver may deliver coordinated voltage pulses to thyristor gates of the solid-state switch array during this phase. By normalizing timing offsets relative to the slowest electromagnetic particle accelerator, the system can synchronize plasma generation and velocity trigger timing balanced to merge at a desired location simultaneously at the convergence time 1004.

The trigger balancing and synchronizing phase may include precise sub-microsecond timing intervals determined by a digital control system to achieve plasma convergence at the convergence time 1004. A first interval may correspond to a trigger balancing phase where the voltage divider network may maintain proper voltage sharing across thyristor arrays. A second interval may represent a plasma generation phase where the snubber circuit network may absorb transient electrical energy during switching. A third interval may indicate a convergence timing interval where electromagnetic particle accelerators may deliver synchronized plasma streams to the parametrically-defined volume. These intervals may compensate for individual trigger breakdown times, plasma velocities, and distances to goal convergence, with timing normalized to the slowest trigger for coordinated switching operations. The first plasma stream P1, the second plasma stream P2, the third plasma stream P3, and the fourth plasma stream P4 represent plasma streams from four electromagnetic particle accelerators that converge simultaneously at the parametrically-defined volume at the convergence time 1004 despite staggered trigger timing.

The ferrite core gate driver may provide coordinated switching across thyristor arrays, enabling plasma generation and velocity trigger timing balanced to merge at the desired location simultaneously at the convergence time 1004. In some cases, at least one ferrite core having multiple sets of windings may be configured to simultaneously trigger the gate terminals of the solid-state switches and deliver a voltage pulse to the gate terminals of the solid-state switches to simultaneously transition the solid-state switches to a conducting state. This digitized approach provides repeatable plasma convergence for magneto-inertial fusion applications through temporal control of multiple pulsed power driven electromagnetic particle accelerators.

Figure 11:
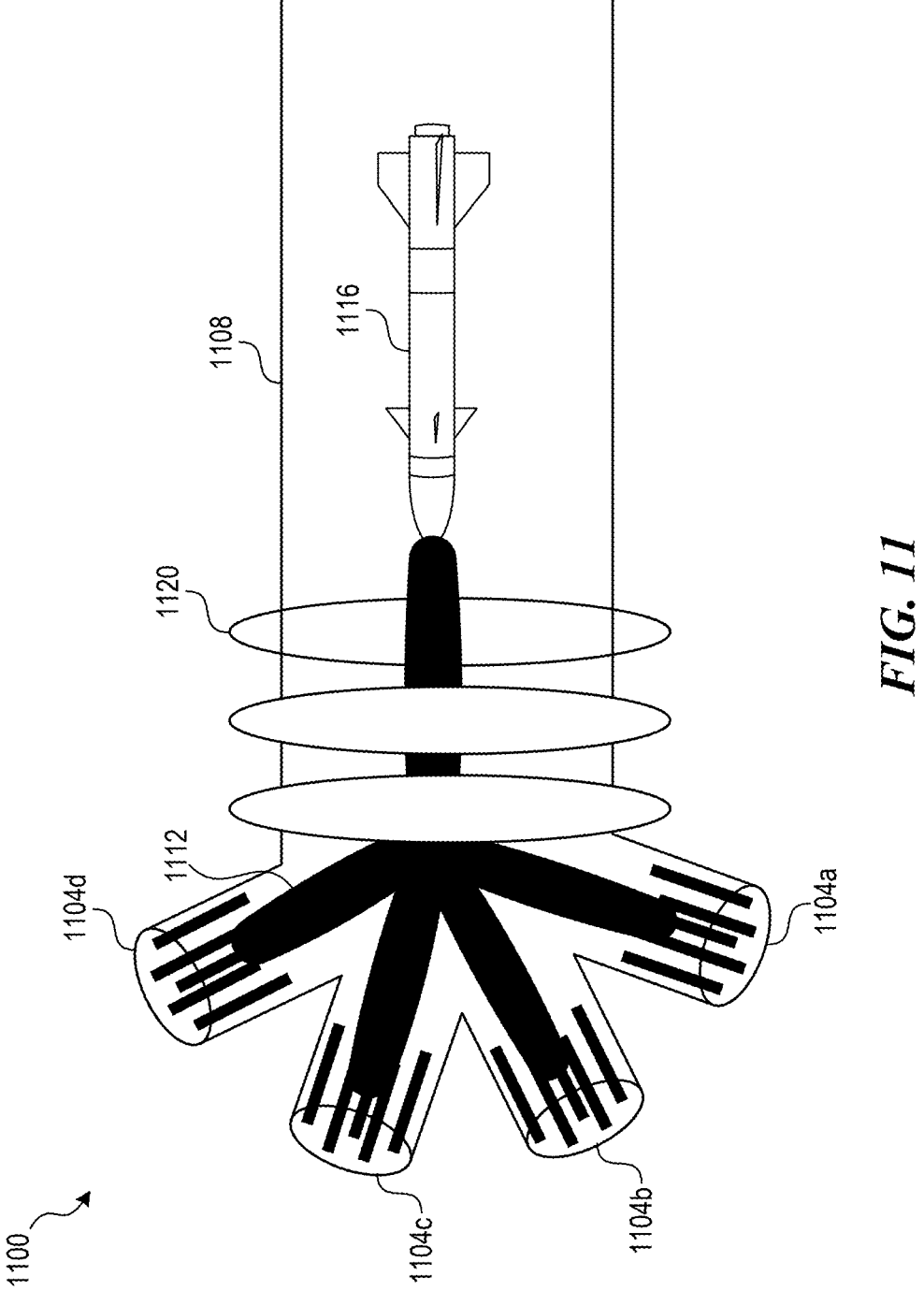
FIG. 11 illustrates an example modular electromagnetic accelerator apparatus configured in accordance with various embodiments of the present technology.

FIG. 11 illustrates an example electromagnetic accelerator system 1100 for simulating hypersonic flight conditions. The electromagnetic accelerator system 1100 includes a test chamber 1108, a hypersonic vehicle 1116, one or more magnetic coils 1120, and multiple accelerator modules including a first accelerator module 1104a, a second accelerator module 1104b, a third accelerator module 1104c, and a fourth accelerator module 1104d.

The electromagnetic particle accelerators 1204a-h may be disposed in a closed shell arrangement around the convergence point 1208. This symmetric configuration enables uniform plasma density distribution and scalable plasma generation capacity. The modular design allows for additional accelerators while maintaining symmetry. The electromagnetic particle accelerators can also be arranged in an open configuration, allowing flexible positioning and scalability. This arrangement enables control of plasma streams directed towards a parametrically-defined convergence point. The open array facilitates adjustable three-dimensional positioning, output direction vectors, and angles for each accelerator, optimizing plasma generation and convergence for magneto-inertial fusion or hypersonic testing applications.

The test chamber 1108 provides a controlled environment for simulating high-speed atmospheric conditions encountered by the hypersonic vehicle 1116. The hypersonic vehicle 1116 shown in FIG. 11 is not necessarily a real hypersonic vehicle used in actual tests. Rather, it represents a test article, material, or model of a hypersonic vehicle that may be used to simulate hypersonic flight conditions within the test chamber 1108. The electromagnetic accelerator system 1100 is designed to create controlled plasma environments that mimic the extreme conditions encountered during hypersonic flight. By using plasma streams 1112 generated by the accelerator modules 1104a-d, researchers can study how hypersonic vehicle designs and materials interact with high-temperature, high-velocity plasma flows without the need for actual flight tests. This approach allows for cost-effective and repeatable testing of hypersonic vehicle components, materials, and designs under simulated flight conditions in a laboratory setting. The test article 1116 may be a scaled model, prototype component, or representative geometry that allows researchers to gather data on hypersonic flight effects without the risks and expenses associated with real hypersonic flight testing.

In some cases, the test chamber 1108 is configured as a vacuum chamber with adjustable pressure settings to replicate different atmospheric conditions. The hypersonic vehicle 1116 may be positioned within the test chamber 1108 for exposure to simulated flight conditions. The atmospheric layer may represent a simulated region of the atmosphere surrounding the hypersonic vehicle 1116 within the test chamber 1108. The accelerator modules 1104a-d may be arranged around the test chamber 1108 in a systematic configuration. Each accelerator module may be controlled by a solid state switch array containing thyristor-based switching elements arranged in series and parallel configurations. In some cases, the accelerator modules 1104a-d may generate high-velocity plasma streams 1112 that converge towards a central axis of the test chamber 1108.

A ferrite core gate driver may provide coordinated switching across multiple thyristors with sub-microsecond precision, enabling control of the plasma streams 1112 generated by the accelerator modules 1104a-d. A voltage divider network and snubber circuit network may protect the solid-state switches during high-power discharge operations required for plasma generation. A digital control system may coordinate plasma generation, velocity, and trigger timing to merge plasma streams 1112 at desired locations simultaneously through determined timing offsets. In some cases, the digital control system determines operational parameters including three-dimensional position coordinates, output direction vectors, output angles, and/or output velocities of the accelerator modules 1104a-d relative to a parametrically-defined convergence point within the test chamber 1108.

The electromagnetic accelerator system 1100 may simulate hypersonic flight conditions by controlling the timing, intensity, and/or composition of plasma streams 1112 generated by the accelerator modules 1104a-d. Different atmospheric layers or measurement planes may be simulated to determine how the hypersonic vehicle 1116 interacts with various atmospheric conditions at different altitudes. In some implementations, the digital control system simulates hypersonic flight conditions by varying output velocities of the accelerator modules 1104a-d. The digital control system may also simulate atmospheric conditions for hypersonic flight testing by adjusting pressure within the test chamber 1108. The electromagnetic accelerator system 1100 may enable testing of materials, designs, and systems for hypersonic vehicles without the need for actual flight tests.

Different atmospheric layers or measurement planes can be simulated to determine how the hypersonic vehicle 1116 interacts with various atmospheric conditions at different altitudes. By controlling the timing, intensity, and composition of the plasma streams from each accelerator, a wide range of hypersonic flight conditions can be replicated. This setup enables testing of materials, designs, and systems for hypersonic vehicles without the need for actual flight tests, providing a cost-effective and controlled environment for hypersonic development.

Figure 12:
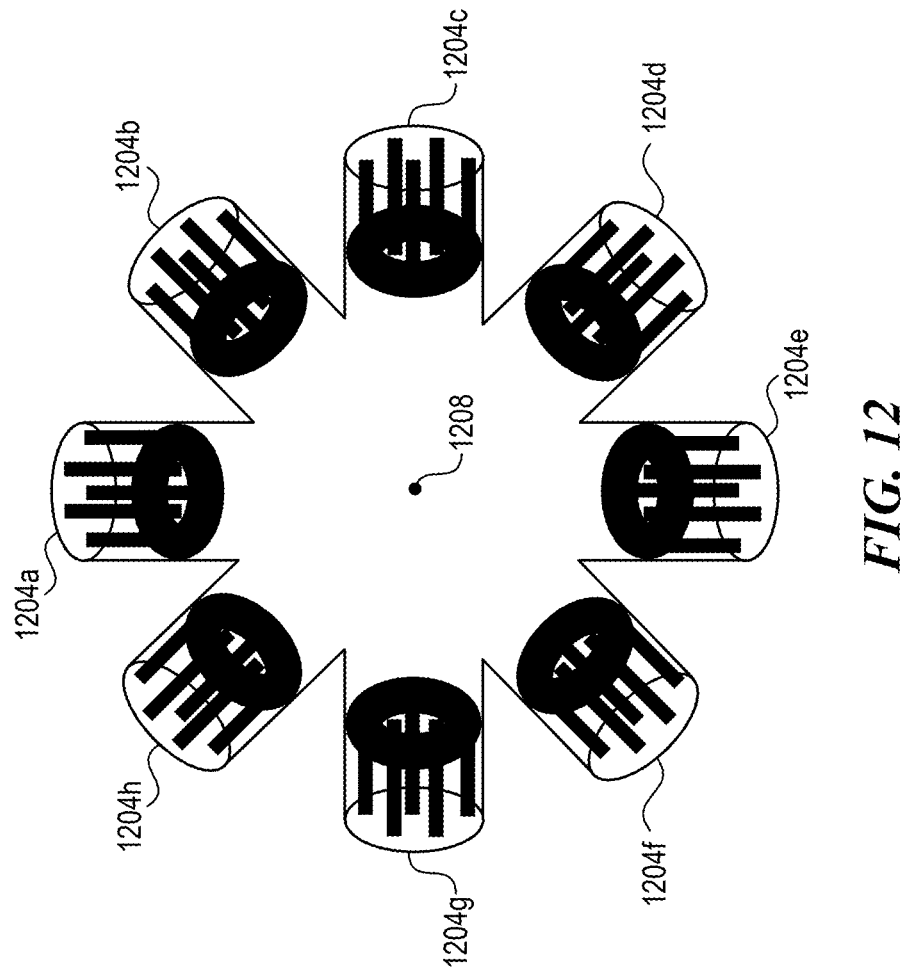
FIG. 12 illustrates eight example electromagnetic particle accelerator modules arranged in a symmetric pattern around a central convergence point in accordance with various embodiments of the present technology.

FIG. 12 illustrates an example electromagnetic particle accelerator configuration. The configuration includes eight electromagnetic accelerator modules 1204a-h (sometimes referred to as electromagnetic particle accelerators) arranged in a symmetric pattern around a central convergence point 1208. Each electromagnetic accelerator module 1204a-h may be controlled by corresponding solid-state switch arrays containing thyristor-based switching elements arranged in series and parallel configurations.

A vacuum environment housing may enclose the parametrically-defined convergence point 1208. This housing provides a controlled low-pressure environment for plasma operations. The convergence point's three-dimensional coordinates are defined within a chamber, serving as the focal point for multiple electromagnetic accelerator modules 1204a-h arranged symmetrically around it. This configuration enables coordinated plasma generation and convergence, e.g., for fusion or hypersonic testing applications. The electromagnetic particle accelerators 1204a-h may be disposed within the vacuum environment housing or attached to its exterior surface. This configuration allows flexibility in system design while maintaining precise control over plasma generation.

A trigger balancing and synchronizing phase for the electromagnetic accelerator modules 1204a-h is shown by FIG. 12. During this phase, a digital control system may determine precise timing offsets for each electromagnetic accelerator module 1204a-h. These timing offsets may be based on empirically measured trigger breakdown times, plasma velocities, and three-dimensional position coordinates relative to the parametrically-defined convergence point 1208. In some cases, a timing controller may determine when each electromagnetic accelerator module 1204a-h fires to compensate for varying distances and plasma propagation characteristics. A ferrite core gate driver may deliver coordinated voltage pulses to thyristor gates across all eight electromagnetic accelerator modules 1204a-h with sub-microsecond precision.

Each electromagnetic accelerator module 1204a-h may contain internal structural elements arranged in radial patterns, representing plasma acceleration components. The symmetric positioning of the electromagnetic accelerator modules 1204a-h around the convergence point 1208 may enable uniform plasma density distribution at the central convergence point 1208. The modular design of the electromagnetic accelerator configuration may allow for scalable expansion to achieve higher plasma generation capacity. This scalability may be achieved through coordinated operation of multiple electromagnetic accelerator modules 1204a-h. In some cases, additional electromagnetic accelerator modules may be added to the configuration to increase plasma generation capacity while maintaining the symmetric arrangement around the convergence point 1208.

A solid state switch array may control the electromagnetic accelerator modules 1204a-h, with a voltage divider network and a snubber circuit network protecting the solid-state switches during high-power discharge operations. A ferrite core assembly may provide simultaneous triggering of the gate terminals of the solid-state switches across all electromagnetic accelerator modules 1204a-h, enabling coordinated plasma generation and convergence at the central convergence point 1208.

Figure 13:
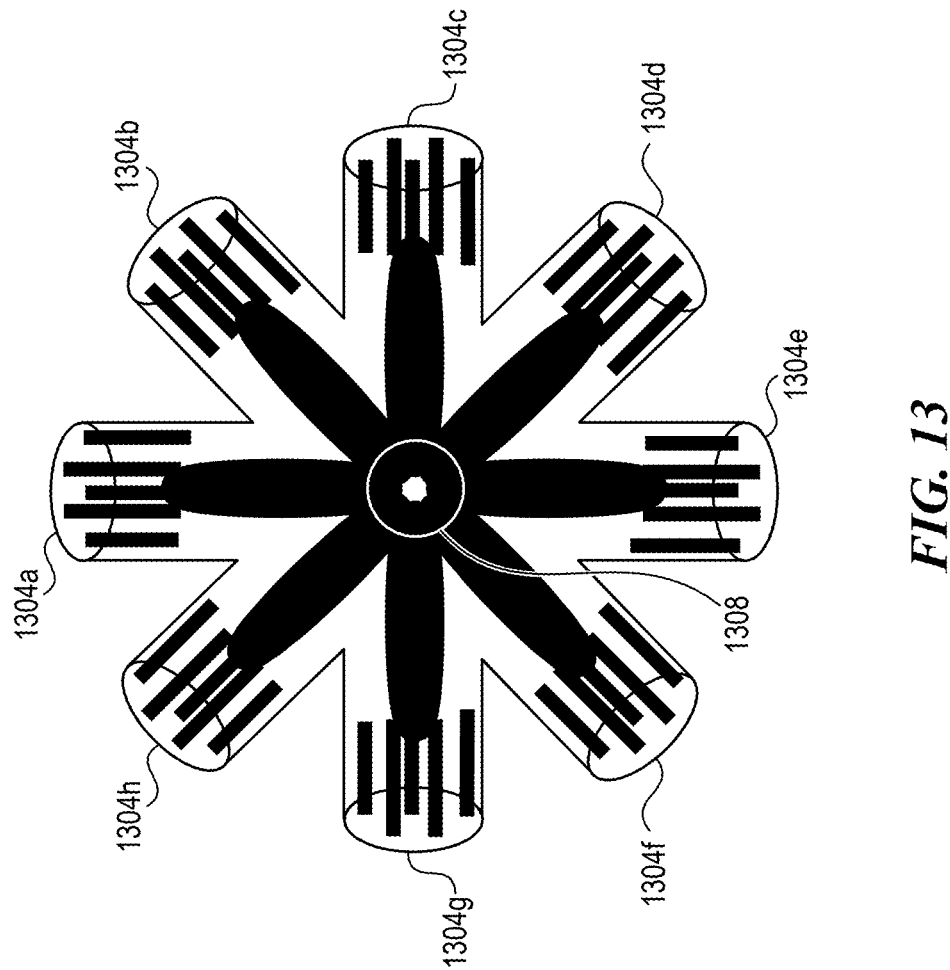
FIG. 13 illustrates eight example electromagnetic particle accelerator modules, with each module generating plasma streams that converge simultaneously at a parametrically-defined central convergence point in accordance with various embodiments of the present technology.

FIG. 13 illustrates an example radial electromagnetic particle accelerator configuration in a plasma generation phase. The configuration includes a first accelerator module 1304a, a second accelerator module 1304b, a third accelerator module 1304c, a fourth accelerator module 1304d, a fifth accelerator module 1304e, a sixth accelerator module 1304f, a seventh accelerator module 1304g, and an eighth accelerator module 1304h arranged in a radial spoke-like configuration around a central convergence point 1308.

In some cases, each accelerator module 1304a-h is configured to generate plasma streams directed toward the central convergence point 1308. The radial arrangement of the accelerator modules 1304a-h may facilitate uniform plasma convergence from multiple directions for magneto-inertial fusion applications. A digital control system may determine timing offsets for each accelerator module 1304a-h based on empirically measured trigger breakdown times, plasma velocities, and three-dimensional position coordinates relative to the central convergence point. In some cases, each accelerator module 1304a-h connects to solid-state switch arrays containing thyristor-based switching elements that control plasma generation timing with sub-microsecond precision.

A timing controller may determine when each accelerator module 1304a-h fires to compensate for varying radial distances and plasma propagation characteristics. This compensation may ensure plasma generation, velocity, and trigger timing balanced to merge at the central convergence point simultaneously. A ferrite core gate driver may deliver coordinated voltage pulses to thyristor gates across all eight accelerator modules 1304a-h. The radial arrangement of the accelerator modules 1304a-h may facilitate uniform plasma density distribution at the central convergence point 1308. In some cases, the modular design enables scalable plasma generation capacity through synchronized operation of multiple accelerator modules 1304a-h for magneto-inertial fusion applications.

Figure 14:
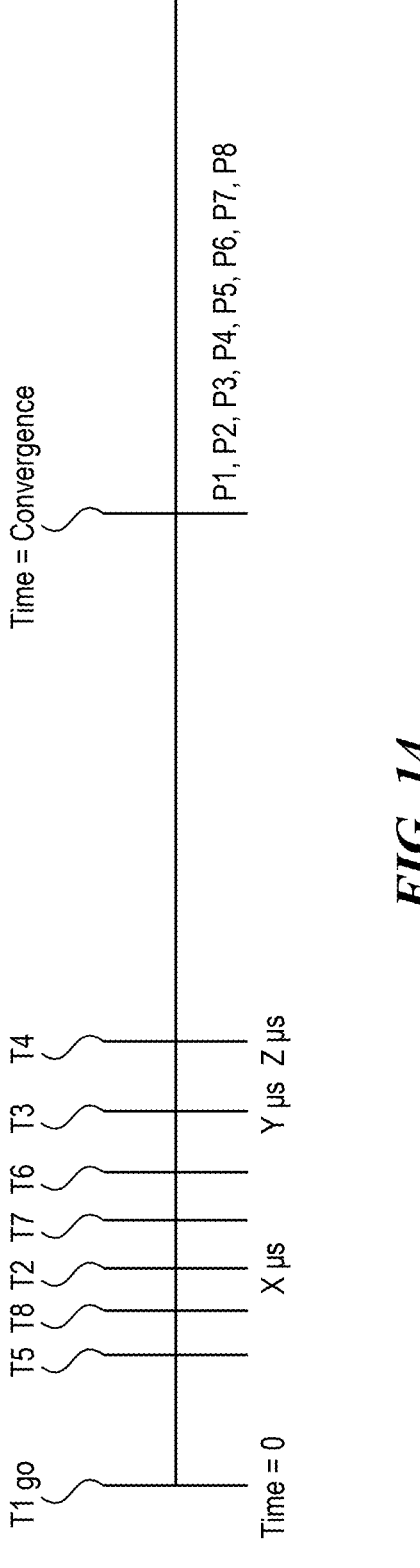
FIG. 14 illustrates an example trigger balancing and synchronizing phase where triggers are sequentially activated in accordance with various embodiments of the present technology.

FIG. 14 illustrates an extended trigger balancing and synchronizing phase for converging multiple electromagnetic particle accelerators. The figure depicts the reference time Time=0, a first trigger signal T1, second trigger signal T2, third trigger signal T3, fourth trigger signal T4, fifth trigger signal T5, sixth trigger signal T6, seventh trigger signal T7, and eighth trigger signal T8. For example, the first trigger signal T1 can be associated with the first accelerator module 1304a illustrated and described in more detail with reference to FIG. 13, and so on.

The figure also shows timing for a first plasma stream P1, second plasma stream P2, third plasma stream P3, fourth plasma stream P4, fifth plasma stream P5, sixth plasma stream P6, seventh plasma stream P7, and eighth plasma stream P8. For example, the first plasma stream P1 can be associated with the first accelerator module 1304a illustrated and described in more detail with reference to FIG. 13. The first trigger signal T1 initiates at the reference time Time=0 as a normalized reference point for the slowest trigger breakdown time. The fifth trigger signal T5, the second trigger signal T2, the sixth trigger signal T6, the third trigger signal T3, the fourth trigger signal T4, the eighth trigger signal T8, and the seventh trigger signal T7 follow the first trigger signal T1 at determined intervals based on average breakdown times determined for each electromagnetic particle accelerator.

In some cases, each trigger signal corresponds to a specific electromagnetic particle accelerator with individually determined trigger breakdown times. The trigger breakdown time may be measured as the duration from control signal activation to plasma initiation reaching a defined percentage maximum. In some implementations, the trigger breakdown times may be empirically measured using Rogowski coils and voltage probes. The timing sequence may account for semiconductor doping and impedance factors affecting each solid-state switch array's trigger breakdown time. The digital control system may compensate for plasma velocity, which may be the time required for plasma to reach the geometrically defined convergent point. In some cases, the plasma velocity may be measured using fast shutter cameras.

Distance to goal convergence varies depending on convergent plasma experiment goals. The staggered trigger timing ensures that despite different breakdown times and plasma velocities, all eight plasma streams converge simultaneously at the parametrically-defined target location, achieving precise temporal and spatial coordination for magneto-inertial fusion applications. The staggered trigger timing provides that despite different breakdown times and plasma velocities, all eight plasma streams converge simultaneously at a parametrically-defined target location. This achieves precise temporal and spatial coordination for magneto-inertial fusion applications. A digital control system may determine timing offsets based on empirically measured trigger breakdown times, plasma velocities, and three-dimensional positioning of each electromagnetic particle accelerator relative to the parametrically-defined convergence point. Each trigger signal may compensate for individual plasma propagation delays and varying distances to achieve plasma generation, velocity, and trigger timing balanced to merge at the desired location simultaneously.

A timing controller can determine when each electromagnetic particle accelerator fires to ensure all eight plasma streams arrive at the convergence point within the same temporal window. This may enable magneto-inertial fusion through precise digital timing coordination. In some cases, any individually triggerable switch with digitized (repeatable) discharge timing may be tuned for convergence control. The methods disclosed herein are not dependent on a specific type of solid-state switch.

FIG. 15 illustrates a flowchart for a computer-implemented method for digitized plasma magneto-inertial fusion. The method may be used for coordinating multiple electromagnetic particle accelerators to achieve synchronized plasma convergence at parametrically-defined target locations for magneto-inertial fusion applications. All or a subset of one or more of the steps of the method can be executed by various components or devices of the digitized plasma magneto-inertial fusion system 600, such as the digital control system 614 and/or the timing controller 616. Additionally, or alternatively, all or a subset of any one or more of the steps of the method can be executed in accordance with the discussion above and/or with the discussion below.

At 1504, a trigger breakdown time is determined for each solid-state switch array of multiple solid-state switch arrays by measuring a duration from initiation of a control signal to plasma formation for each electromagnetic particle accelerator of multiple pulsed power driven electromagnetic particle accelerators. The step 1504 may involve measuring the trigger breakdown time using voltage probes and current measurement devices to detect when plasma discharges begin following the control signal. The step 1504 may further involve characterizing semiconductor doping and impedance factors corresponding to each solid-state switch array that contribute to variations in the measured trigger breakdown time. As used herein, "semiconductor doping and impedance factors" refer to characteristics of solid-state switches that affect trigger breakdown times. These factors may include the type and concentration of dopants in the semiconductor material and the electrical impedance properties of the switch components. Semiconductor doping and impedance factors affect each solid-state switch array's trigger breakdown time. These characteristics influence the duration from control signal activation to plasma initiation reaching a defined percentage maximum. The timing sequence accounts for these factors, which can be empirically measured using Rogowski coils and voltage probes. This data enables determination of timing offsets for synchronized plasma convergence at a parametrically-defined point.

In some cases, Rogowski coils are used to detect current initiation in each electromagnetic particle accelerator to provide timing measurements. The step 1504 may account for variations in trigger breakdown times that result from differences in semiconductor characteristics and electrical properties of individual solid-state switch arrays. For example, Rogowski coils may be positioned around each electromagnetic particle accelerator to measure current flow. These toroidal coils detect changes in magnetic field induced by current initiation, generating voltage signals proportional to the rate of current change. The signals are processed to determine precise timing of plasma formation, enabling accurate measurement of trigger breakdown times for each accelerator with sub-microsecond resolution.

At 1508, a timing profile is generated for each electromagnetic particle accelerator based on the determined trigger breakdown times. The step 1508 may involve storing the timing profile for each electromagnetic particle accelerator in a digital control system. The timing profile can include a statistical analysis of multiple trigger breakdown time measurements for each solid-state switch array. Characterization data can be created that accounts for variations in trigger breakdown times across multiple discharge cycles. In some cases, patterns in trigger breakdown time measurements are analyzed to identify consistent timing characteristics for individual electromagnetic particle accelerators. The digital control system can predict timing behavior of electromagnetic particle accelerators based on historical performance data.

At 1512, timing offsets are determined for each solid-state switch array based on the determined trigger breakdown times to compensate for timing variations between the electromagnetic particle accelerators. Timing offsets can be normalized relative to an electromagnetic particle accelerator associated with a longest trigger breakdown time to establish a reference baseline for timing determination. Timing offsets can be determined that account for differences in spatial positioning, directional orientation, and plasma propagation characteristics of individual electromagnetic particle accelerators. In some cases, compensating for plasma propagation delays is performed based on measured velocity characteristics of the electromagnetic particle accelerators. Timing offsets can be determined that enable simultaneous convergence of plasma discharges despite variations in individual accelerator characteristics.

At 1516, the solid-state switch arrays are simultaneously triggered in accordance with the determined timing offsets to converge corresponding plasma discharges at a parametrically-defined volume. Trigger signals can be transmitted to the solid state switch arrays configured to control the electromagnetic particle accelerators. The trigger signals are configured to simultaneously trigger the electromagnetic particle accelerators to converge their outputs at a convergence target zone. The timing of control signals can be coordinated to account for the determined timing offsets and provide synchronized plasma convergence. In some cases, the convergence point is adjusted prior to transmitting the trigger signals to accommodate changes in experimental parameters or target positioning. A digital control system may adjust the convergence point by recalculating the three-dimensional coordinates within the vacuum chamber. This adjustment prompts recalibration of timing offsets and operational parameters for each electromagnetic accelerator module. The digital control system can update the ferrite core gate driver's coordinated voltage pulse sequence, such that synchronized plasma convergence occurs at the new parametrically-defined point before transmitting trigger signals to the solid-state switch arrays. Magneto-inertial fusion applications can be enabled where synchronized plasma convergence creates conditions for fusion reactions through temporal and spatial coordination of multiple plasma streams.

Although the steps 1504, 1508, 1512, and 1516 are discussed and illustrated in a particular order, the method of FIG. 15 may not be so limited. In other embodiments, all or a subset of one or more of the steps 1504, 1508, 1512, and 1516 of the method 1500 can be performed in a different order. In these and other embodiments, all or a subset of any of the steps 1504, 1508, 1512, and 1516 of the method 1500 can be performed before, during, and/or after all or a subset of any of the other steps 1504, 1508, 1512, and 1516 of the method 1500. Furthermore, a person skilled in the art will readily recognize that the method 1500 can be altered and still remain within these and other embodiments of the present technology. For example, all or a subset of one or more steps 1504, 1508, 1512, and 1516 of the method 1500 can be omitted and/or repeated in some embodiments.

Computer System

Figure 16:
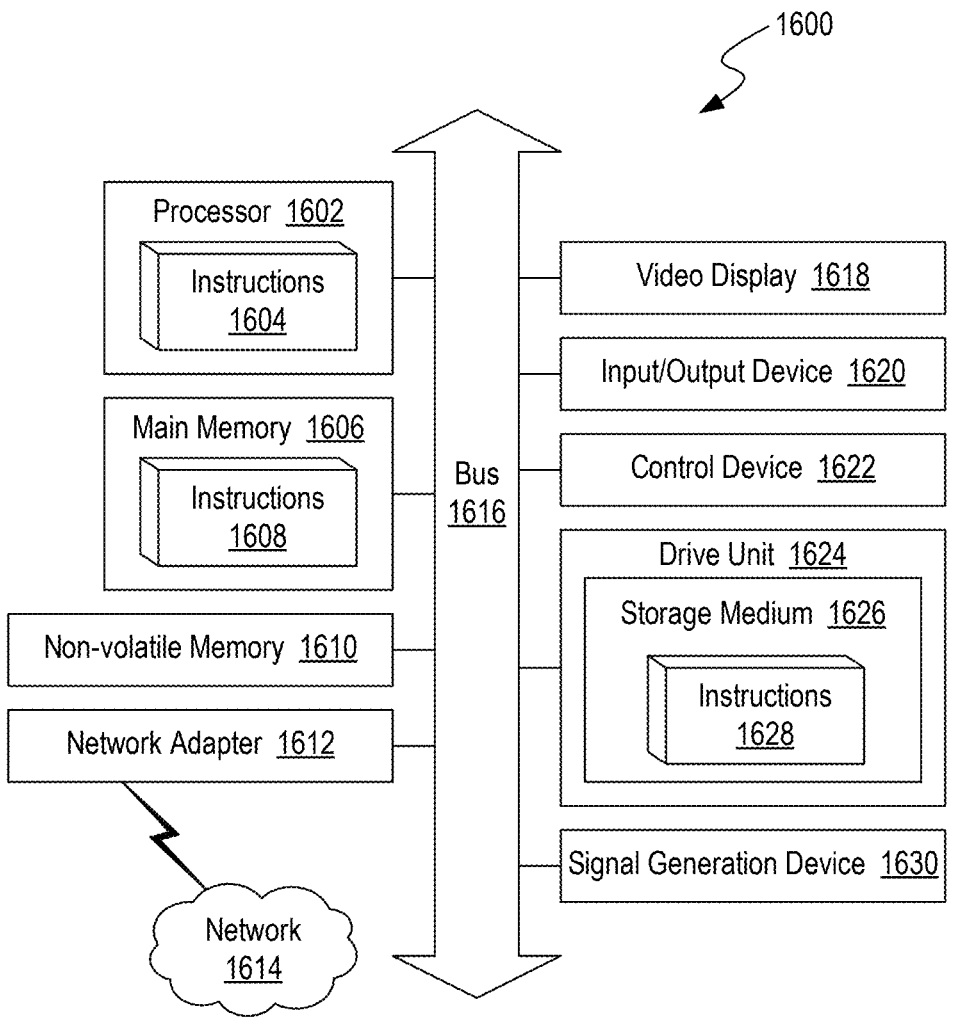
FIG. 16 illustrates a block diagram of an example computer system configured in accordance with various embodiments of the present technology.

FIG. 16 is a block diagram that illustrates an example of a computer system 1600 in which at least some operations described herein can be implemented. As shown, the computer system 1600 can include: one or more processors 1602, main memory 1606, non-volatile memory 1610, a network interface device 1612, video display device 1618, an input/output device 1620, a control device 1622 (e.g., keyboard and pointing device), a drive unit 1624 that includes a storage medium 1626, and a signal generation device 1630 that are communicatively connected to a bus 1616. The bus 1616 represents one or more physical buses and/or point-to-point connections that are connected by appropriate bridges, adapters, or controllers. Various common components (e.g., cache memory) are omitted from FIG. 16 for brevity. Instead, the computer system 1600 is intended to illustrate a hardware device on which components illustrated or described relative to the examples of the figures and any other components described in this specification can be implemented.

The computer system 1600 can take any suitable physical form. For example, the computer system 1600 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 1600. In some implementation, the computer system 1600 can be an embedded computer system, a system-on-chip (SOC), a single-board computer system (SBC) or a distributed system such as a mesh of computer systems or include one or more cloud components in one or more networks. Where appropriate, one or more computer systems 1600 can perform operations in real-time, near real-time, or in batch mode.

The network interface device 1612 enables the computer system 1600 to mediate data in a network 1614 with an entity that is external to the computer system 1600 through any communication protocol supported by the computer system 1600 and the external entity. Examples of the network interface device 1612 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 1606, non-volatile memory 1610, machine-readable medium 1626) can be local, remote, or distributed. Although shown as a single medium, the machine-readable medium 1626 can include multiple media (e.g., a centralized/distributed database and/or associated caches and servers) that store one or more sets of instructions 1628. The machine-readable (storage) medium 1626 can include any medium that is capable of storing, encoding, or carrying a set of instructions for execution by the computer system 1600. The machine-readable medium 1626 can be non-transitory or include a non-transitory device. In this context, a non-transitory storage medium can include a device that is tangible, meaning that the device has a concrete physical form, although the device can change its physical state. Thus, for example, non-transitory refers to a device remaining tangible despite this change in state.

Remarks

The terms "example", "embodiment" and "implementation" are used interchangeably. For example, reference to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the examples, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following examples should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the examples. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

We claim:

1. A solid-state switch array apparatus for direct current discharge, comprising:

multiple solid-state switches arranged in series and parallel configurations, wherein the multiple solid-state switches are configured to transition to a conducting state for the direct current discharge;

a corresponding resistor circuit connected in parallel with each solid-state switch, wherein the corresponding resistor circuit is configured to distribute voltage across each solid-state switch during a charging operation to prevent an overvoltage condition across the multiple solid-state switches, wherein the corresponding resistor circuit has a resistance associated with bleed-over current characteristics of each solid-state switch during the overvoltage condition, and wherein each solid-state switch is configured to hold back a direct current voltage supplied by a charged capacitor during the charging operation;

a corresponding snubber circuit connected in parallel with each solid-state switch, wherein the corresponding snubber circuit is configured to:

absorb electrical energy spikes during the direct current discharge, and protect each solid-state switch from transient back electromotive force generated during the direct current discharge, and wherein the corresponding snubber circuit comprises a capacitor having a capacitance associated with a characteristic of a load of the solid-state switch array apparatus;

a load balance resistor connected across the load of the solid-state switch array apparatus, wherein the load balance resistor has a resistance associated with a total resistance of corresponding resistor circuits connected in parallel with the multiple solid-state switches; and at least one ferrite core having multiple sets of windings, wherein each of the multiple sets of windings is connected to corresponding gates of the multiple solid-state switches, and wherein the at least one ferrite core is configured to:

simultaneously trigger the corresponding gates of the multiple solid-state switches, and deliver a voltage pulse to the corresponding gates of the multiple solid-state switches to simultaneously transition the multiple solid-state switches to the conducting state.

2. The solid-state switch array apparatus of claim 1, wherein the corresponding snubber circuit comprises:

a resistor connected in series with the capacitor.

3. The solid-state switch array apparatus of claim 2, wherein the resistor is configured to:

dissipate energy stored in the capacitor; and dampen oscillations between the capacitor and parasitic inductances.

4. The solid-state switch array apparatus of claim 1, wherein the load balance resistor is configured to control voltage distribution between the solid-state switch array apparatus and the load.

5. The solid-state switch array apparatus of claim 1, wherein the corresponding resistor circuit is configured to divert leakage currents around each solid-state switch during the charging operation.

6. The solid-state switch array apparatus of claim 1, wherein the corresponding resistor circuit is configured to receive a constant current flow from a power supply during the charging operation.

7. The solid-state switch array apparatus of claim 1, wherein each solid-state switch comprises a thyristor.

8. A solid-state switch array apparatus, comprising:

multiple solid-state switches arranged in series and parallel configurations, wherein the multiple solid-state switches are configured to transition to a conducting state for direct current discharge;

a corresponding resistor circuit connected in parallel with each solid-state switch to distribute voltage across each solid-state switch during a charging operation, wherein each corresponding resistor circuit has a resistance associated with bleed-over current characteristics of each solid-state switch during an overvoltage condition, and wherein each solid-state switch is configured to hold back a direct current voltage supplied by a charged capacitor during the charging operation; and a corresponding snubber circuit connected in parallel with each solid-state switch and comprising a capacitor configured to absorb electrical energy spikes during the direct current discharge, wherein the corresponding snubber circuit is configured to protect each solid-state switch from transient back electromotive force generated during the direct current discharge, and wherein the capacitor has a capacitance associated with a characteristic of a load of the solid-state switch array apparatus.

9. The solid-state switch array apparatus of claim 8, comprising:

a resistor connected in series with the capacitor and configured to:

dissipate energy stored in the capacitor; and dampen oscillations between the capacitor and parasitic inductances.

10. The solid-state switch array apparatus of claim 8, wherein each solid-state switch comprises a silicon-controlled rectifier in puck form factor.

11. The solid-state switch array apparatus of claim 8, wherein each solid-state switch comprises an insulated-gate bipolar transistor.

12. The solid-state switch array apparatus of claim 8, comprising:

a load balance resistor connected across the load of the solid-state switch array apparatus, wherein the load balance resistor has a resistance associated with a total resistance of corresponding resistor circuits connected in parallel with the multiple solid-state switches.

13. The solid-state switch array apparatus of claim 8, comprising:

at least one ferrite core having multiple sets of windings and configured to:

deliver a voltage pulse to the multiple solid-state switches to simultaneously transition the multiple solid-state switches to the conducting state.

14. A solid-state switch array apparatus comprising:

multiple solid-state switches arranged in series and parallel configurations;

a corresponding resistor circuit connected in parallel with each solid-state switch to distribute voltage across each solid-state switch during a charging operation;

a load balance resistor connected across a load of the solid-state switch array apparatus, wherein the load balance resistor has a resistance associated with a total resistance of corresponding resistor circuits connected in parallel with the multiple solid-state switches, and wherein the load balance resistor is configured to control voltage distribution between the solid-state switch array apparatus and the load; and a corresponding snubber circuit connected in parallel with each solid-state switch, wherein the corresponding snubber circuit is configured to:

absorb electrical energy spikes during direct current discharge, and protect each solid-state switch from transient back electromotive force generated during the direct current discharge, and wherein the corresponding snubber circuit comprises a capacitor having a capacitance associated with a characteristic of the load of the solid-state switch array apparatus.

15. The solid-state switch array apparatus of claim 14, comprising:

at least one ferrite core having multiple sets of windings and configured to:

deliver a voltage pulse to the multiple solid-state switches to simultaneously transition the multiple solid-state switches to a conducting state.

16. The solid-state switch array apparatus of claim 14, wherein the corresponding resistor circuit is configured to divert leakage currents around each solid-state switch during the charging operation.

17. The solid-state switch array apparatus of claim 14, wherein the multiple solid-state switches are configured to hold back a greater direct current voltage than a single solid-state switch during the charging operation.

18. The solid-state switch array apparatus of claim 14, wherein the solid-state switch array apparatus is configured for use in a pulsed direct current power application.

19. The solid-state switch array apparatus of claim 14, wherein the solid-state switch array apparatus is configured for driving a plasma gun or for generating a pulsed magnetic field.

* * * * *